United States Patent
Lynn

(10) Patent No.: US 12,139,677 B2
(45) Date of Patent: Nov. 12, 2024

(54) CENTRIFUGE REACTOR SYSTEM AND METHOD

(71) Applicant: Other Lab, LLC, San Francisco, CA (US)

(72) Inventor: Peter Sturt Lynn, Alameda, CA (US)

(73) Assignee: Other Lab, LLC, San Francisco, CA (US)

( * ) Notice: Subject to any disclaimer, the term of this patent is extended or adjusted under 35 U.S.C. 154(b) by 252 days.

(21) Appl. No.: 17/868,579

(22) Filed: Jul. 19, 2022

(65) Prior Publication Data

US 2022/0363997 A1  Nov. 17, 2022

Related U.S. Application Data

(63) Continuation of application No. 16/788,640, filed on Feb. 12, 2020, now Pat. No. 11,421,161.
(Continued)

(51) Int. Cl.
*C10G 9/18* (2006.01)
*B01J 19/00* (2006.01)
(Continued)

(52) U.S. Cl.
CPC .......... *C10G 9/18* (2013.01); *B01J 19/0013* (2013.01); *B01J 19/28* (2013.01); *C01B 3/02* (2013.01); *C01B 3/50* (2013.01); *C10G 45/02* (2013.01); *C10G 45/32* (2013.01); *C10G 45/44* (2013.01); *B01J 2219/00033* (2013.01); *B01J 2219/00157* (2013.01); *C01B 2203/0475* (2013.01);
(Continued)

(58) Field of Classification Search
CPC ......... B01J 19/28; B01J 19/1806; C01B 3/50; C01B 2203/0233; C01B 2203/04; C10G 45/44
See application file for complete search history.

(56) References Cited

U.S. PATENT DOCUMENTS

2015/0369026 A1* 12/2015 McConaghy ............ C10G 1/02
  166/57
2016/0131424 A1*  5/2016 Edlund .................. C10L 3/106
  62/625

FOREIGN PATENT DOCUMENTS

WO  WO-2013143243 A1 * 10/2013 .......... B01J 19/2405

OTHER PUBLICATIONS

Lynn, "Centrifuge TDP Recycler," Openthunk, Jun. 1, 2009 (retreived Feb. 15, 2019), http://openthunk.wikidot.com/centrifuge-tdp-recycler, 4 pages.

* cited by examiner

*Primary Examiner* — Anthony J Zimmer
*Assistant Examiner* — Syed T Iqbal
(74) *Attorney, Agent, or Firm* — Davis Wright Tremaine LLP

(57) ABSTRACT

A method of generating a reaction product from a feedstock via a centrifuge reactor that includes introducing a flow of feedstock to a centrifuge reactor, the centrifuge reactor including: a central rotational axis X, and a centrifuge assembly having a reaction chamber with the centrifuge assembly configured to rotate about the central rotational axis X. The method further includes rotating the centrifuge assembly about the central rotational axis X at a tip speed to generate an acceleration gradient from the central rotational axis X and from a first reaction chamber end to a second reaction chamber end and generating reaction conditions in the reaction chamber, the reaction conditions and acceleration gradient causing a separation of products from a reaction of the feedstock within the reaction chamber.

23 Claims, 20 Drawing Sheets

Related U.S. Application Data

(60) Provisional application No. 62/805,964, filed on Feb. 15, 2019.

(51) Int. Cl.
  *B01J 19/28*  (2006.01)
  *C01B 3/02*  (2006.01)
  *C01B 3/50*  (2006.01)
  *C10G 45/02*  (2006.01)
  *C10G 45/32*  (2006.01)
  *C10G 45/44*  (2006.01)

(52) U.S. Cl.
  CPC ..... *C10G 2400/02* (2013.01); *C10G 2400/04* (2013.01); *C10G 2400/08* (2013.01)

CENTRIFUGE REACTOR SYSTEM AND METHOD

CROSS-REFERENCE TO RELATED APPLICATIONS

This application is a continuation of U.S. application Ser. No. 16/788,640, filed Feb. 12, 2020, which is a non-provisional of and claims the benefit of U.S. Provisional Application 62/805,964, filed Feb. 15, 2019, which applications are hereby incorporated herein by reference in their entirety and for all purposes.

BACKGROUND

With increasing electrification, low cost solar combined with battery storage can serve the majority of our energy needs, and this seems economically inevitable. However, some energy demands are harder to fully electrify; for example, seasonal storage, transport fuel, and industrial hydrocarbon use. Excluding all cars and trucks, transport fuels alone still exceed 5 quads. This leaves perhaps 10 quads or more that must come from an on-demand source that is hopefully renewable and more distributed than the current fossil fuel solution.

$50/ton biomass roughly equates to $0.01/kWhr of chemical energy or $0.35/gasoline gallon equivalent, and hydrocarbons are, ideally, fungible. While biomass costs vary greatly (municipal waste generally has negative cost), $50/ton is not atypical, especially if it is near source, and this presents a huge opportunity to solve the last approximately 20% problem. There is about 90 TW (about 2,700 quad) of global photosynthesis, perhaps more. Biomass waste streams alone (agricultural, forestry, and municipal) are near enough, this is assuming high efficiency (>85%), low processing cost (<$10/barrel), and distributed biomass conversion (at source, avoiding transport costs), which all serve to improve the economics and increase the effective size of the resource. This also serves to incentivize higher yield energy crops.

Further, with around a million producing oil wells distributed within the US, such technology can potentially be applied to economic advantage at the wellhead. Integral produced water separation can enable operation at lower hydrocarbon fractions and extends oil well life. The inefficiencies of oil refineries alone (about 90%) present approximately a 3 quad opportunity.

Direct combustion, anaerobic digestion, pyrolysis, and hydrothermal liquefaction are methods of biomass conversion; however, US oil refineries average in excess of 90% efficiency with total operating costs of less than $10/barrel, suggesting a much higher performance approach. Capital costs are around $25 k/barrel/day of processing capacity and steam reformation and hydrogenation are oil refinery processes that enable the upgrading of low quality hydrocarbons. The challenge is to miniaturize an oil refinery so that it can operate in a distributed manner at source of feedstock, and adapt it to operate directly off biomass. This could also disrupt large scale oil refineries—the steel mini mill analogy.

Global average photosynthetic energy production is about 90 TW, whereas total global average energy use is about 18 TW. Approximately one third of all land area is forested and another third is used for agriculture and pastoral land. Intensive and extensive use of high yield energy crops such as sorghum and fast growing trees could further significantly increase this photosynthetic energy yield. Biomass energy sources, specifically forestry, farming, and human waste streams, which are currently mostly left to decay naturally, have the potential to economically scale to levels sufficient to replace near all current fossil fuel use and thereby enable a renewable and energy independent hydrocarbon fuel economy.

Assuming a future where solar power supplies a large proportion of global energy needs, the intermittency of solar power will necessitate an energy source or energy storage medium that can offset seasonal variation in solar power. Advanced battery technologies may become economically viable for providing daily energy storage, but are a couple of orders of magnitude too expensive to provide annual seasonal storage. Biomass presents a practical renewable energy solution to this seasonal energy storage problem. Nuclear power being more suited to year round base load power, hydro power/storage being site limited, power transmission lines from the other hemisphere being impractical, hydrogen being difficult to store with inefficient conversion, and so forth. Further, in such a solar powered future, hydrocarbon fuels would still likely be required for many applications, for example, air travel, shipping, and industrial chemical processes. While extensive use of solar power could greatly reduce the need for hydrocarbon fuels, it does not appear able to eliminate their need. An extensive economically viable sustainable hydrocarbon fuel solution is still required, and biomass appears to be the most likely source.

In order to substantially upscale biomass as an energy source, direct and efficient conversion of biomass to hydrocarbon fuels is required. Nearly all of the plants should be converted, and ideally, the raw feedstock should not compete directly with food production. Given the distributed nature of biomass production and the high cost of transport, biomass conversion may also need to be distributed, that is, it may also need to be economically viable at smaller distributed scales. Ideally, what is desired is a "universal" conversion system that accepts most any organic waste stream, (e.g., sewage, cellulose, tires, plastics, landfill waste, and the like) and converts it to useful hydrocarbons. Hydrothermal liquefaction, which can use pressure and temperature to replicate the natural process of fossil fuel creation, but in a more timely manner (potentially less than 30 minutes), can achieve this requirement in some examples. However, to be extensively commercially viable, further improvements in efficient pressure and thermal energy recovery are needed. Ideally, it must become a continuous high throughput process with integral upgrading to low oxygen content high value gasoline/diesel/jet-fuel equivalent liquid fuels. Significant cost reductions are desired, as are effective purification systems, for example, sulfur removal as per a conventional gas/oil refinery.

BRIEF DESCRIPTION OF THE DRAWINGS

FIG. 6 illustrates an example of separation or fractions and conditions that can be generated in the reaction chamber, which can include, precursors, reactants, products, byproducts, and the like.

Figure 1:
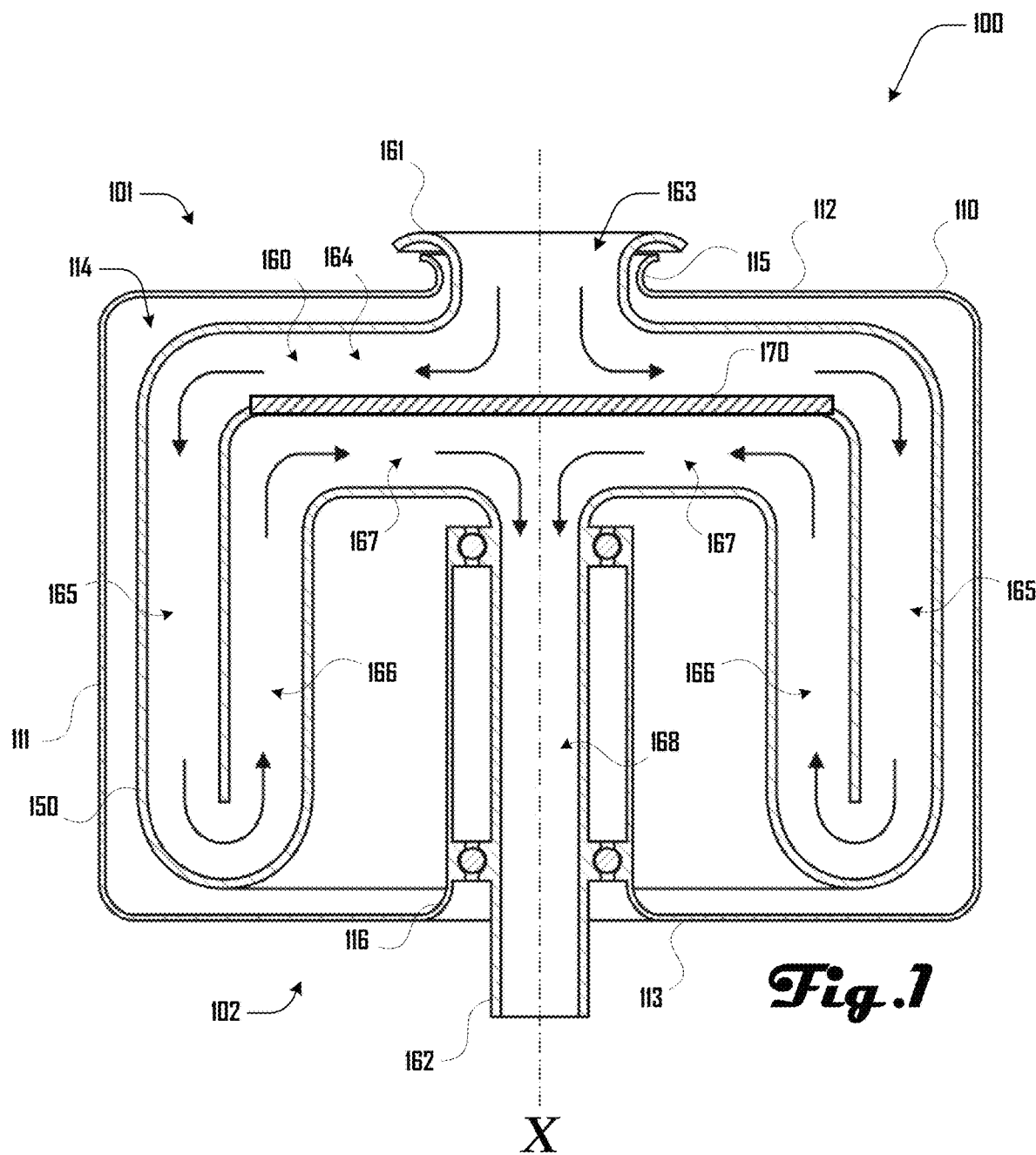
FIG. 1 illustrates a side cross-sectional view of an example embodiment of a centrifuge reactor.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

In various embodiments discussed herein, a centrifuge reactor can be configured to perform a method of extreme process intensification that enables high temperature and pressure chemical reactions with integral separation at high efficiency and low-cost. Specifically, various examples can enable the integration, miniaturization, and mobilization of oil refining while also extending the range of viable feedstocks to include low-cost biomass such as agricultural, forestry, municipal waste, and the like. This can be accomplished in various embodiments via hydrothermal liquefaction with integral upgrading via steam reformation and hydrogenation. By combining low-quality and low-cost distributed feedstocks with high efficiency low-cost processing, some embodiments can generate distributed gasoline equivalent biofuels at about $0.50/gallon, substantially undercutting existing fossil fuel sources. Replacing liquid fossil fuels presents a 37 quad opportunity. With comprehensive decarbonization via electrification and low-cost solar and batteries, around 10 quads of biofuels are likely still desired to meet seasonal storage, transport fuel, and industrial hydrocarbon needs. This would enable a near 100% renewable energy future at a cost against which the existing fossil fuel industry cannot reasonably compete.

In various examples, a centrifuge reactor can perform process intensification and can directly replace oil refineries at higher efficiency and lower cost with the added capacity to operate on much lower quality feedstocks, including biomass, coal, and the like. Natural gas supplementation is also present in some examples.

Embodiments of a centrifuge reactor can have various aspects, including continuous flow with near-zero net pumping power, where biomass enters at ambient pressure at a central axis of rotation and reaches high pressure at the tip of a rotating centrifuge assembly, with the pressure reducing back to near ambient upon exit (e.g., like a syphon). This can depend on relative densities with gases coming out at much higher pressures (a potential power source to drive the system).

In some examples, feedstock does not need to be ground up. Particle size need only be small enough to flow through the given pipe diameter—this can favor a larger unit. Inlet pipe diameter can be roughly one-tenth reactor diameter in some examples.

Some examples can include integral centrifuge separation of water, salts, gases, and hydrocarbons, which can be combined with temperature and pressure based separation (e.g., fractional distillation).

Some embodiments can include integral steam reformation (endothermic) and hydrogenation (exothermic), which can allow for direct fuel upgrading (oxygen removal) at high efficiency. Near zero net external energy input may be required in some examples. Various examples can include integral counter-flow heat exchangers for efficient heat recovery.

Some embodiments can include direct chemical reaction feedback loops using separation to remove desired reaction products, which in some examples, enables near 100% conversion (e.g., exploiting Le Chatelier's principle). This can accelerate effective reaction times as reaction products can be removed as they are produced. Undesired side products can be minimized.

In various embodiments, a centrifuge reactor can be highly compact. With reaction times as little as a few minutes in some examples, the reactor can potentially process multiple times its own weight in feedstock per hour, be mobile, and achieve large production volumes. In some embodiments, a centrifuge reactor is usable at source-fixed plant installation costs and expensive transport of biomass can be avoided. In various examples, high-quality fuel can be produced onsite, avoiding the need for extensive centralized hydrocarbon logistics, refineries, and distribution systems. Nutrients from the biomass can be separated as salts and can be returned directly to the land. Supplemental nitrogen can increase nitrate production (Haber Bosch) bypassing the need for external nitrate fertilizers. With integral water separation in some examples, a centrifuge reactor can be relatively insensitive to feedstock water content.

Hydrothermal liquefaction (HTL) in some examples replicates the natural process of fossil fuel creation by using temperature (e.g., 250-600° C.) and pressure (e.g., 5-35 MPa), but over a much shorter time scale (e.g., half an hour or less). By performing this process continuously within a centrifuge, pressure can be near-ideally recuperated and next to no pumping power is required in some examples. The pressure vessel can be open to atmospheric pressure at the center of rotation where wet biomass can be directly added and the resulting gas, oil, coal, water, salts, and the like, can be directly removed. With integral steam reformation and hydrogenation near total, hydrocarbon conversion to oil is possible in various embodiments. In further embodiments, a centrifuge reactor can be used to selectively produce various suitable hydrocarbons, hydrogen, methane, propane, or the like. There are also many chemical reactions beyond hydrocarbons that further embodiments of a centrifuge reactor can be applicable to.

Combined with a counter-flow heat exchanger for the recovery of thermal energy, conversion efficiencies in excess of 85% can be expected for waste streams in some embodiments. Various embodiments include a highly efficient, robust, scalable, high throughput waste stream insensitive system that can be applied to a wide variety of distributed biomass and biowaste resources, including raw landfill. Global energy use and global photosynthetic production is approximately 18 TW and 90 TW respectively. Efficient distributed biomass and biowaste thermal depolymerization can replace virtually all fossil fuel use and cleanup most organic waste streams.

In some aspects, embodiments of a centrifuge reactor discussed herein can include continuous flow with near-zero net energy pumping power where biomass enters at ambient pressure at the central axis and reaches very high pressure at a tip of the centrifuge reactor, with pressure reducing back to near-ambient upon exit (e.g., like a syphon). In various examples, this depends on relative densities with gases coming out at much higher pressures.

In some embodiments, the feedstock does not need to be ground up and particle size need only be small enough to allow flow through the given pipe diameter of the centrifuge reactor. Various embodiments can include integral centrifuge separation of water, salts, gases, and hydrocarbons. Some examples can include integral steam reformation (endothermic) and hydrogenation (exothermic) which can allow for direct fuel upgrading (oxygen removal) at high efficiency. In various embodiments, near-zero net external energy input is required. Embodiments can include integral counter-flow heat exchangers for efficient heat recovery.

Various examples can include direct chemical reaction feedback loops using separation to remove desired reaction products, which can enable near 100% chemical conversion (exploiting Le Chatelier's principle). This can also greatly speed up effective reaction times in some examples as reactions processes do not need to wait until completion. Undesired side-products are minimized in various examples.

Various embodiments can be highly compact in terms of mass and/or overall size. For example, in some embodiments, a centrifuge reactor can have a low average residence time (e.g., 30, 45, 60, 120 minutes, and the like). In other words, in various examples, a centrifuge reactor can process its reactor chamber volume in reactants/products quickly (e.g., 3, 2, 1.5, 1, 0.5, 0.25 volumes per hour).

Additionally, in some embodiments, a centrifuge reactor can have a high centrifuge reactor system mass-to-production-mass ratio (e.g., the number of times the centrifuge reactor can process its own mass in reactants/products per hour). For example, in one embodiment (e.g., an Inconel centrifuge reactor), the centrifuge reactor can produce more than a tenth of its own mass in liquid hydrocarbons per hour. In another embodiment, (e.g., a predominantly carbon fiber reactor) the centrifuge reactor can produce more than its own mass in liquid hydrocarbons per hour. Further embodiments can process 0.1, 0.2, 0.5, 0.75, 1.0, 1.5, 2.0, 3.0, 4.0, 5.0 or 10 times the mass of the centrifuge reactor in liquid hydrocarbons per hour.

With reaction times as little as a few minutes in some examples, a reactor may process multiple times its own weight in feedstock per hour. Payback times can be as little as a few months and the reactor can be mobile in some embodiments. Being usable on site can allow for expensive transport of biomass to be avoided. Large production volumes can be generated with small mobile units in accordance with some embodiments.

Embodiments can include the ability to use an external energy source to remove oxygen and thereby increase yield/production and substantially reduce carbon dioxide production, for example, via electrolysis production of hydrogen. Some embodiments can use an air-cooled or liquid-cooled carbon fiber shell that substantially provides centrifuge and pressure vessel structure, dramatically reducing system weight and cost in some examples.

FIG. 1 illustrates a side cross-sectional view of an example embodiment of a centrifuge reactor 100 having a first end 101 and a second end 102 with a central rotational axis X. The centrifuge reactor 100 comprises a housing 110 having a sidewall 111, a first housing end 112 and second housing end 113 that define a cavity 114. The first housing end 112 defines a first housing opening 115 and the second housing end 113 defines a second housing opening 116 at the first and second ends 101 and 102 of the centrifuge reactor 100 respectively.

The centrifuge reactor 100 further comprises a centrifuge assembly 150 that is rotationaly disposed within the cavity 114 of the housing 110 and configured to rotate about the central rotational axis X. The centrifuge assembly 150 defines a channel 160 that extends and folds within the cavity 114 from a first channel opening 161 at the first end 101 of the centrifuge reactor 100 to a second end 162 at the second end 102 of the centrifuge reactor 100.

As shown in the example embodiment of FIG. 1 the channel 160 comprises the channel opening 161 that opens to an entry portion 163, that extends to a first channel portion 164 that extends perpendicular to the axis X and along the first housing end 112 at the first end 101 of the centrifuge reactor 100. The channel 160 continues by curving to a second channel portion 165 that extends along the sidewall 111 from the first end 101 to the second end 102 parallel to the axis X. The channel 160 continues to a third channel portion 166 by folding back toward the first end 101 parallel to the axis X and along an internal face that defines the second channel portion 165. The channel 160 continues by curving to a fourth channel portion 167 that extends toward and perpendicular to the axis X along an internal face that defines first channel portion 164. A counter-flow heat exchanger 170, which can be disposed at an interface of the first and fourth channel portions 164, 167. The channel 160 continues to a channel exit shaft portion 168 that extends along the axis X and out the second housing opening 116 at the second end 102 of the centrifuge reactor 100.

Figure 2:
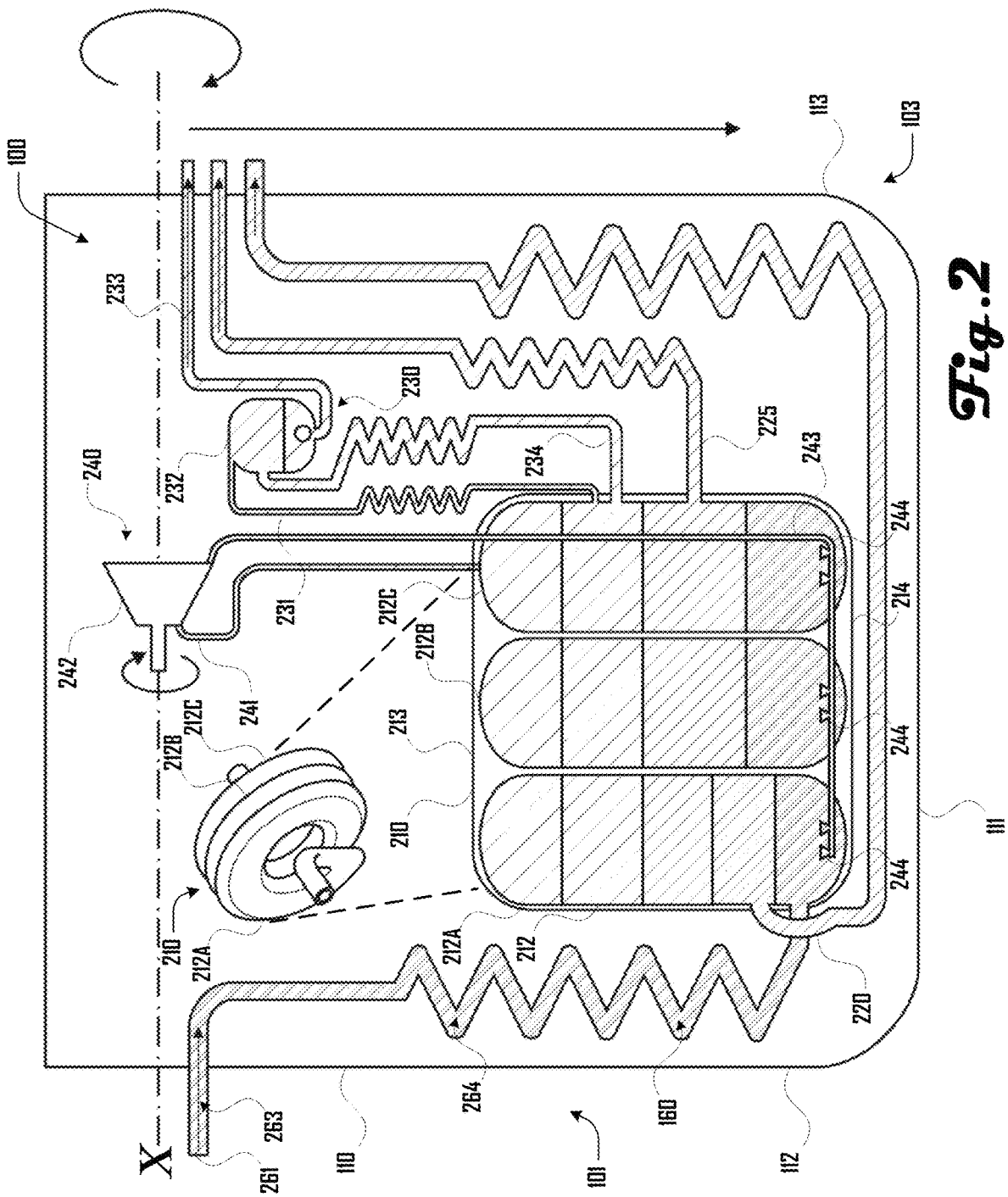
FIG. 2 illustrates a partial side cross-sectional diagram view of an embodiment of a centrifuge reactor.

FIG. 2 illustrates a partial side cross-sectional diagram view of an embodiment of a centrifuge reactor 100. It should be noted that, inasmuch as the embodiment shown in FIG. 2 is analogous to the embodiment of FIG. 1, the illustration of FIG. 2 is rotated 90 degrees compared to the illustration of FIG. 1 and the illustration of FIG. 2 shows approximately half of a centrifuge reactor 100 compared to FIG. 1. For example, in FIG. 2, the rotational axis X is shown at the top of the page and horizontal on the page compared to FIG. 1 where rotational axis X is shown as vertical and central on the page.

FIG. 2 illustrates a centrifuge reactor 100 comprising a channel 160 that runs through centrifuge reactor 100 from the first end 101 to the second end 102. Specifically as shown in the example embodiment of FIG. 2 the channel 160 comprises the channel opening 261 that opens to a first channel portion 263 that extends perpendicular to the axis X and along to the first housing end 112 at the first end 101 of the centrifuge reactor 100.

The channel 160 continues to a reaction chamber 210, which can comprise a plurality of reaction chamber portions 212. In some embodiments, and as shown in FIG. 2, the reaction chamber 210 can comprise a toroidal helical body that defines the plurality of reaction chamber portions 212. The reaction chamber 210 can comprise baffles and can be configured to support high pressure. Pressure, temperature and/or rotational forces applied to the reaction chamber 210 as discussed herein can generate one or more product separations or gradients within the reaction chamber portions 212, from a first end 213 to a second of the 214 of the reaction chamber 210, and in some embodiments, such product separations or gradients can be different between the respective reaction chamber portions 212. Such product separations or gradients can be generated based on one or more of an acceleration gradient within reaction chamber 210 from the first end 213 to the second end 214 generated based on rotation of the reaction chamber 210 about the rotational axis X; the same or different pressures within the reaction chamber portions 212, the same or different temperatures within the reaction chamber portions 212, removal and/or addition of certain compounds, elements, or materials from the reaction chamber 210 and the like.

For example, FIG. 2 illustrates an example having first, second and third reaction chamber portions 212A, 212B, 212C. The first reaction chamber portion 212A is shown comprising a product separation or gradient that comprises, methane ($CH_4$), carbon dioxide ($CO_2$), oil/hydrocarbons, subcritical water, and tar. The second reaction chamber portion 212B is shown comprising a product separation or gradient that comprises, methane ($CH_4$), carbon dioxide ($CO_2$), oil/hydrocarbons, and tar. The third reaction chamber portion 212C is shown comprising a product separation or gradient that comprises, methane ($CH_4$), carbon dioxide ($CO_2$), oil/hydrocarbons, and tar.

Water (and materials dissolved and/or suspended in the water) can be removed from the first reaction chamber portion 212A via a first fraction channel 220 that extends along the sidewall 111 to the second end 103 of the centrifuge reactor 100 and along the second housing 113 and out of the centrifuge reactor 100 at the second end 103 proximate to the central axis X. In various examples, the first fraction channel 220 can be coupled to a side of the first reaction chamber portion 212A proximate to the second end 214 of the first chamber portion 212A.

Additionally, tar and/or other materials can be removed from the second end 214 of the third chamber portion 212C via the first fraction channel 220 coupled to the second end 214 of the third chamber portion 212C. In some embodiments, separate fraction channels can remove material from the first and third chamber portions 212A, 212C instead of a single fraction channel.

Additionally, oil and/or hydrocarbons can be removed from the third chamber portion 212C via a second fraction channel 225 that can extend from a side of the third chamber portion 212C to the second end 103 of the centrifuge reactor 100 and out of the centrifuge reactor 100 at the second end 103 proximate to the central rotational axis X. In various embodiments a gasoline equivalent, diesel equivalent, jet-fuel equivalent and/or the like can be removed from the third chamber portion 212C via the second fraction channel 225.

Additionally, carbon dioxide can be removed from the third chamber portion 212C via a carbon dioxide separation system 230 that includes a first line 231 that removes material including carbon dioxide from the third chamber portion 212C to a carbon dioxide separator 232 that at least separates carbon dioxide from material received from the third chamber portion 212C via the first line 231. Carbon dioxide can leave the centrifuge reactor via an exit line 233 that can be proximate to the central rotational axis X, a return line 234 can return material remaining after carbon dioxide separation to the third chamber portion 212C.

Additionally, a mixing system 240 can remove material from the first end 213 of the reaction chamber 210 and introduce the material, either in an original or modified form, to the second end of the reaction chamber 210. For example, as shown in the example of FIG. 2, the mixing system 240 can comprise a first mixing line 241 coupled to the first end 213 of the third chamber portion 212C, which can allow material removed from the first end 213 of the third chamber portion 212C to travel to a compressor 242, which can compress the material and introduce the compressed material to the second end 214 of the reaction chamber via nozzle line 243, to nozzles 244 disposed at the bottom ends 214 of the first, second and third chamber portions 212A, 212B, 212C. In some embodiments, material removed from the first end of the of the third chamber portion 212C can comprise hydrogen, stream, and the like.

In various embodiments, the reaction chamber 210 can be exposed to various conditions as discussed herein. For example, where the reaction chamber 210 is rotated as discussed herein, the reaction chamber can experience an acceleration gradient from the first end 213 to the second end 214 (e.g., $p=\frac{1}{2}\rho v^2$). In some embodiments, different temperatures can be applied to or generated in different portions of the reaction chamber 210 to generate desired product separations or gradients within portions 212 of the reaction chamber 210.

For example, in one embodiment, the first chamber portion 212A can have a reaction temperature of 350° C. or in some embodiments can have a temperature in the range of 300° C.-400° C., 325° C.-375° C., or the like. In one embodiment, the second chamber portion 212B can have a reaction temperature of 475° C. or in some embodiments can have a temperature within in the range of 425° C.-525° C., 450° C.-500° C., or the like. In one embodiment, the second chamber portion 212B can have a reaction temperature of 600° C. or in some embodiments can have a temperature within in the range of 200° C.-1000° C., 200° C.-600° C., 200° C.-700° C., 300° C.-900° C., 400° C.-800° C., 500° C.-700° C., 450° C.-750° C., 500° C.-700° C., 550° C.-650° C., 575° C.-625° C., or the like. In one embodiment, the reaction chamber 210 including all reaction chamber portions 212 can have a reaction pressure of 25 MPa or in some embodiments, can have a reaction pressure in the range of 20-30 MPa, 20-35 MPa, 5-100 MPa, 10-80 MPa, 15-60 MPa, 5-500 MPa, 35-500 MPa, 35-400 MPa, 35-300 MPa, 35-200 MPa, or the like.

Figure 19:
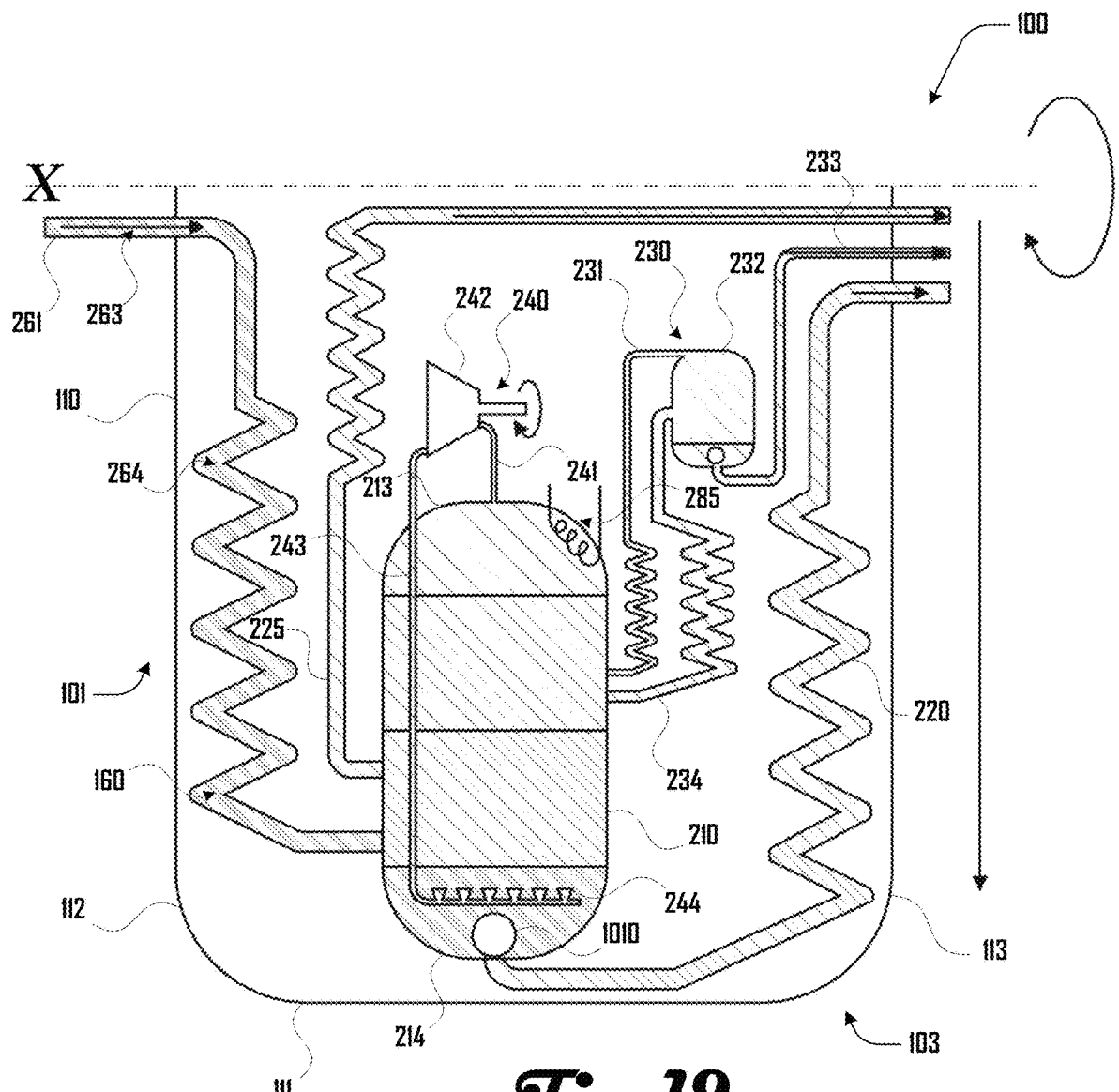
FIG. 19 illustrates a partial side cross-sectional diagram view of an embodiment of a centrifuge reactor.
Figure 20:
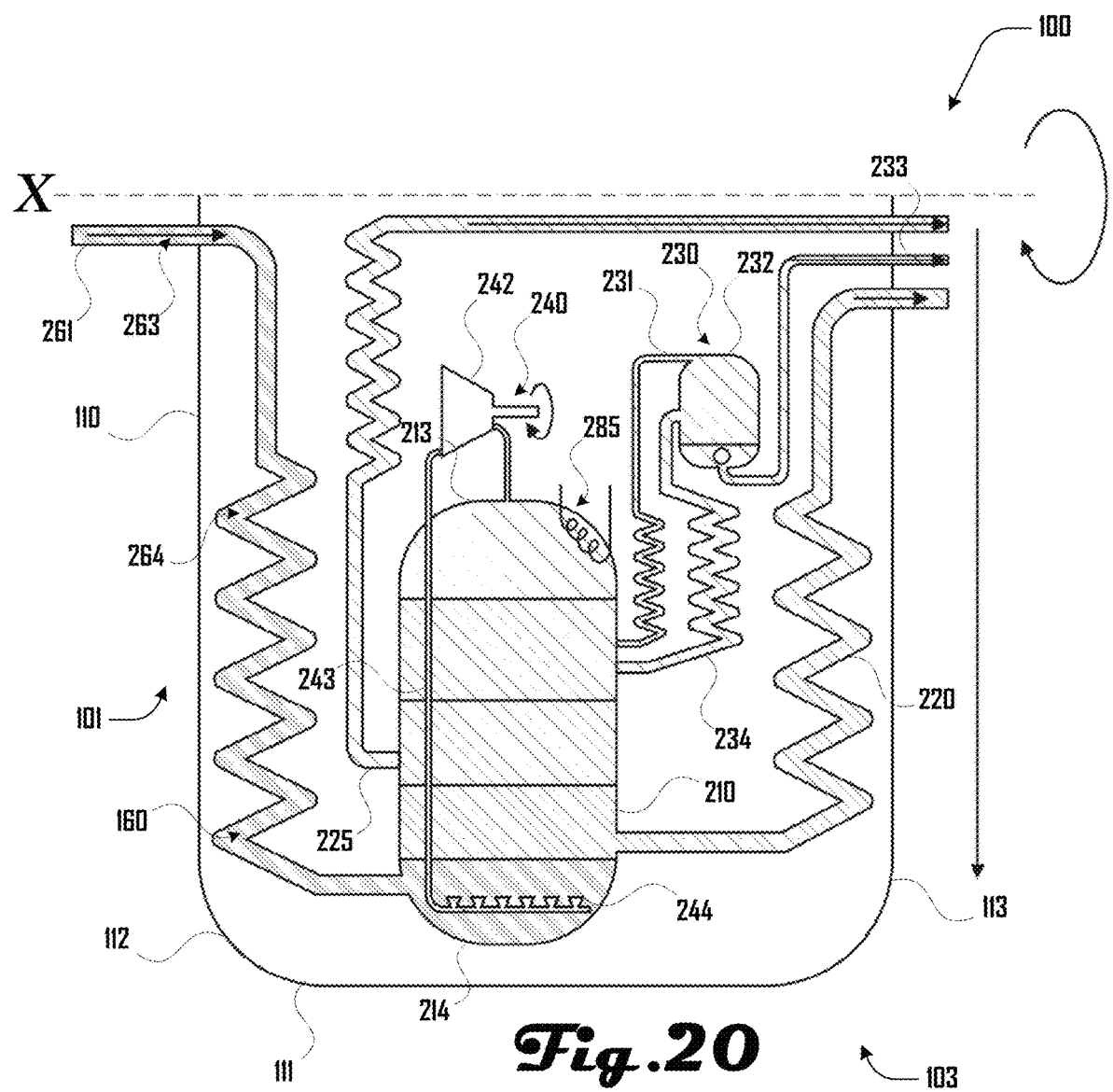
FIG. 20 illustrates a partial side cross-sectional diagram view of another embodiment of a centrifuge reactor.

Further embodiments of a centrifuge reactor 100 can be configured in various suitable ways. For example, FIGS. 19 and 20 illustrate other example embodiments of centrifuge reactor 100. FIG. 19 illustrates an example having a reaction chamber 210 that extends between a first and second end 213, 214 that can generate a set of separations as discussed herein. A heating element 285 can be disposed at the first end 213, which can generate a temperature gradient between the first and second ends 213, 214 of the reaction chamber.

For example, steam reformation can occur within a separation at the first end 213 at a temperature of about 600° C. and a separation at the second end 214 can have a temperature of about 350° C. In some embodiments, hydrogenation (exothermic) can occur at lower temperatures but steam reformation (endothermic) can favor higher temperatures. In various examples, 600° C. is roughly in the middle, such that steam reformation reaction rates are less than ideal, but this can enable hydrogenation to provide the heat needed for steam reformation. Such reaction conditions can improve the overall efficiency of a centrifuge reactor 100.

Additionally, a float valve 1010 can be disposed at the second end, which can provide for water (and materials dissolved and/or suspended in the water) to be removed from the reaction 210 via the first fraction channel 220 that extends along the sidewall 111 to the second end 103 of the centrifuge reactor 100 and along the second housing 113 and out of the centrifuge reactor 100 at the second end 103 proximate to the central axis X. Additionally, in the example of FIG. 19 (and in FIG. 20) the compressor 242 is shown not being coincident with the central rotational axis X (e.g., as shown in FIG. 2).

Additionally, in various embodiments, material can be introduced into the reaction chamber 210 and removed from the reaction chamber 210 at various suitable locations along the length of the reaction chamber 210 between the first and second ends 213, 214. For example, FIG. 19 illustrates an example where water and/or salts are removed via the first line 220 connected at the second end 214 of reaction chamber; feedstock such as biomass being introduced farther from the second end 214 via the channel portion 264; gasoline or equivalent being removed via the second line 225 at a still further distance from the second end 214; hydrogenation and carbon dioxide separation occurring at a yet further distance from the second end 214; and steam reformation and removal of material via the mixing system 240 farthest from the second end 214 at the first end 213.

However, FIG. 20 illustrates an example where feedstock such as biomass is introduced at the second end 214 via the channel portion 264; water and/or salts are removed via the first line 220 connected farther from the second end 214 of reaction chamber; gasoline or equivalent being removed via the second line 225 at a still further distance from the second end 214; hydrogenation and carbon dioxide separation occurring at a yet further distance from the second end 214; and steam reformation and removal of material via the mixing system 240 farthest from the second end 214 at the first end 213.

Figure 3:
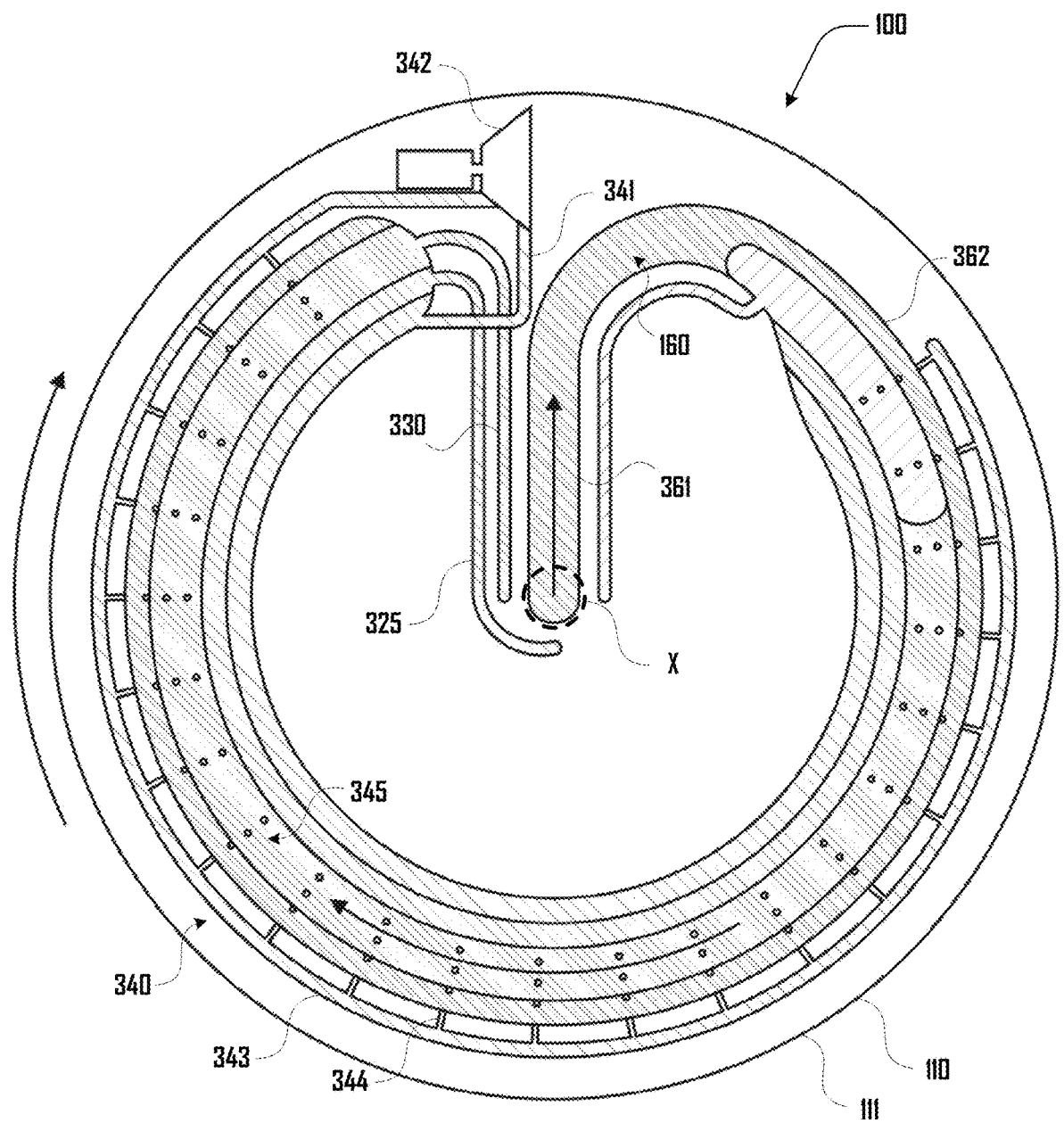
FIG. 3 illustrates a top cross-sectional view of an example centrifuge reactor comprising a plug flow reactor with density fractionation.

Turning to FIG. 3, a top cross-sectional view of an example centrifuge reactor 100 comprising a plug flow reactor with density fractionation is illustrated. The centrifuge reactor 100 is shown having a circular cross section with a central rotational axis X, which in FIG. 3 extends perpendicular to the plane of the cross-sectional view.

The centrifuge reactor 100 can comprise a housing 110 that defines a sidewall 111. A channel 160 can be disposed within the housing 110 (e.g., defined by a centrifuge assembly 150) with the channel 160 comprising a first channel portion 361 that extends to a second channel portion 362 that extends about a portion of an outer circumference of the centrifuge reactor 100 proximate to the sidewall 111. For example, in various embodiments, a precursor material (e.g., biomass) can enter the first channel portion 361 proximate to the central rotation axis X and travel radially toward the sidewall 111 to the second channel portion 362. As discussed herein, the channel 160 can rotate about the axis of rotation X, which can generate an acceleration gradient in the channel 110 (e.g., $p=0.5\rho v^2$ or $p=0.5\rho\omega^2 r^2$). The acceleration gradient along with other reaction conditions (e.g., temperature, pressure, and the like), can generate one or more reactions and one or more product separations or gradients within the channel 160 including the first and/or second channel portions 361, 362. In various embodiments, angular acceleration enables the pressurization a portion of the channel 160 or a reaction chamber 210 and can generate to density based separation.

Various product fractions can be removed from and/or introduced to the channel. For example, a fraction of gasoline, diesel, jet-fuel, or equivalent, or precursor for the same can be removed at an end of the second portion 162 of the channel 160 via a first fraction channel 325 and carbon dioxide can be removed at an end of the second portion 162 of the channel 160 via a second fraction channel 330.

The first and second fraction channels 325, 330 can extend from the second portion 162 of the channel 160 at a periphery of the centrifuge reactor 100 to proximate to the central rotational axis X, where the first and second fraction channels 325, 330 can exit the centrifuge reactor 100. In various embodiments, other elements, compounds or compositions can be removed from the channel 160 at various locations. For example, in some embodiments, water (which can include various things dissolved therein) can be removed from the channel 160 at the first channel portion 161 and proximate to the central rotational axis X.

Additionally, a mixing system 340 can remove fluid at an end of the second portion 162 of the channel 160 and introduce the fluid, either in an original or modified form, to the second portion 162 of the channel 160. For example, as shown in the example of FIG. 3, the mixing system 340 can comprise a first mixing line 341 coupled to an end of the second portion 162 of the channel 160, which can allow fluid removed from the second portion 162 of the channel 160 to travel to a compressor 342, which can compress the fluid and introduce the compressed fluid to the second portion 162 of the channel 160 via nozzles 344 via nozzle line 343. In some embodiments, such fluid can comprise hydrogen, methane, or the like As illustrated in the example of FIG. 3, nozzles 344 can be disposed along the second portion 162 of the channel 160, including in some examples, along more than 50%, 60%, 70%, 80% or 90% of a circumference of the centrifuge reactor 100. The nozzles 344 can be configured to bubble fluid (e.g., hydrogen and/or methane) into the channel at various locations, which can be desirable for facilitating various reactions within the channel 160.

In various embodiments, and as shown in FIG. 3 the nozzles 344 can be disposed and configured to introduce fluid at a peripheral edge of the second portion 162 of the channel 160. Such a configuration can be desirable because it allows fluid (e.g., hydrogen and/or methane) to be introduced to, mix with and/or mix elements, compounds or compositions that are separated or fractioned to the peripheral edge of the second portion 162 of the channel 160.

The first and second fraction channels 325, 330 and mixing line 341 can be disposed on the second portion 162 of the channel 160 based on the location of the various elements, compounds or compositions generated in the second portion 162 of the channel 160. For example, as shown in the example of FIG. 3, the first and second fraction channels 325, 330 and mixing line 341 can be disposed from closer to farther away from the central rotational axis X based on the separation of elements, compounds or compositions such as carbon dioxide, hydrogen, hydrocarbons, and the like.

In various embodiments, the locations of the first and second fraction channels 325, 330 and mixing line 341 can be fixed, or can be movable. For example, in some embodiments, such locations can be changed (e.g., manually or automatically) via a determined location of various elements, compounds or compositions generated in the second portion 162 of the channel 160. Automated configuration changes can be based on sensors in the second portion 162 of the channel 160.

The centrifuge reactor 100 can operate under various conditions as discussed herein. For example, in some embodiments, channel 160 can have a pressure of about 25 MPa, 20-30 MPa, 24-26 MPa, 23-27 MPa, or the like. The channel 160 can be the same temperature along the length of one or both of the first and second portions 361, 362 or can have different temperature. For example, in some embodiments, the temperature of the second portion 362 can increase from a first end coupled to the first portion 361 to a second end of the second portion 362. For example, the first end of the second portion 362 can have reaction temperature of 350° C. and the second end can have a reaction temperature of 600° C.

Figure 4:
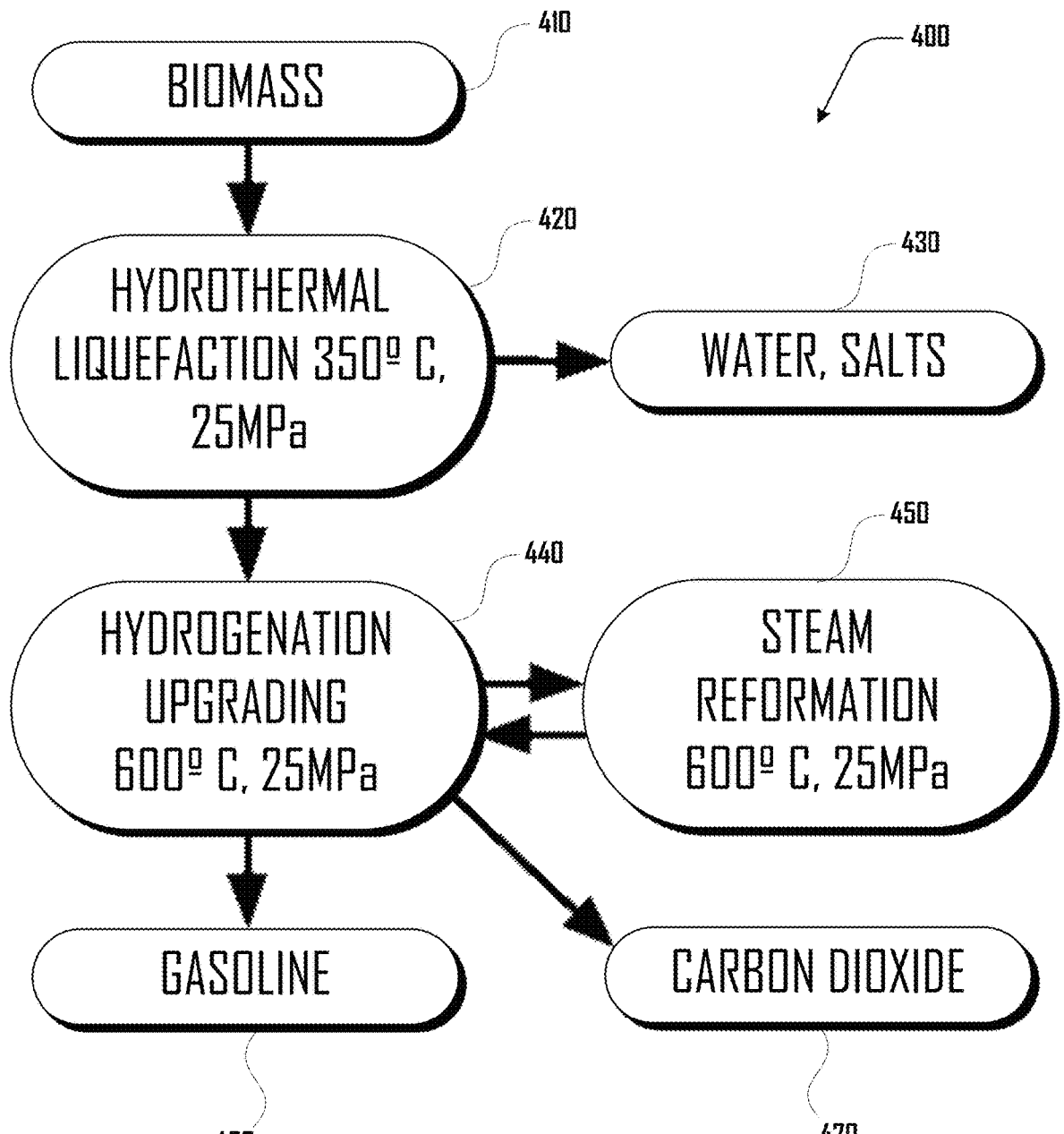
FIG. 4 illustrates an example of a reaction method that can be performed in some embodiments with a centrifuge reactor.

FIG. 4 illustrates an example of a reaction method 400 that can be performed in some embodiments with a centrifuge reactor 100. In the example of FIG. 4, biomass 410 is a precursor for hydrothermal liquefaction 420 (e.g., at 350° C., 25 MPa, 30 MPa or 35 MPa). At least a portion of the products of the hydrothermal liquefaction 420, such as water and salts 430, can be removed and the remaining products can be a precursor for hydrogenation upgrading 440 (e.g., at 600° C., 25 MPa). The hydrogenation upgrading 440 can comprise steam reformation 450 (e.g., at 600° C., 25 MPa). For example, some embodiments can comprise steam reformation 450 and can include a mixing system (e.g., mixing systems 240, 340 of FIGS. 2 and 3) that removes fluid (e.g., hydrogen and methane) from a first location of a reaction chamber and introduces the fluid, either in an original or modified form, to one or more second locations.

Products of the hydrogenation upgrading 440 can include gasoline 460 (or the like) and carbon dioxide 470. Such products can be removed from a reaction chamber as discussed herein. While specific temperature and pressure conditions are illustrated, this should not be construed as being limiting on the variety of other reaction conditions that can be used in further embodiments as discussed herein.

Figure 5:
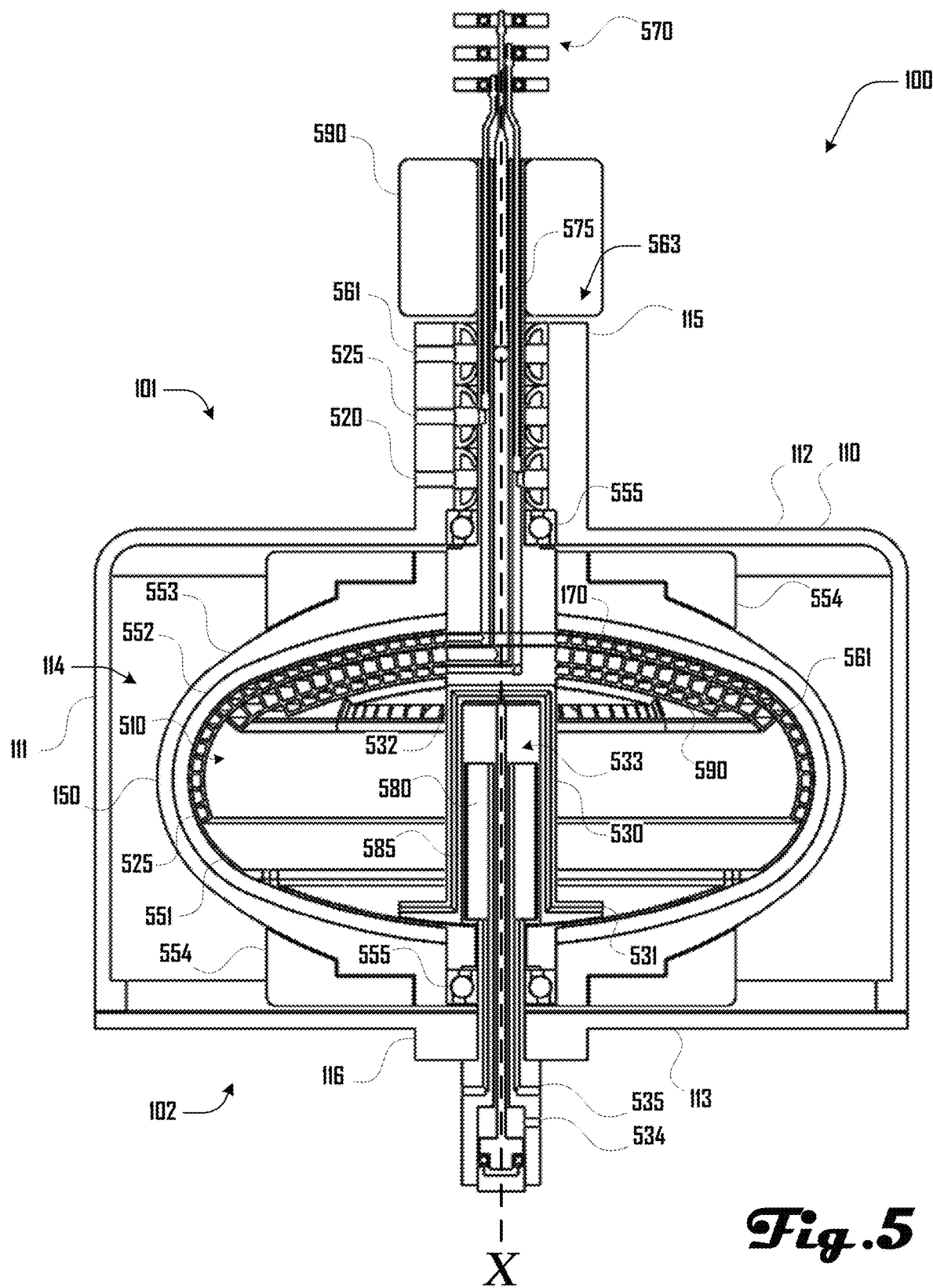
FIG. 5 illustrates a side cross-sectional view of another example embodiment of a centrifuge reactor.

FIG. 5 illustrates a side cross-sectional view of an example embodiment of a centrifuge reactor 100 having a first end 101 and a second end 102 with a central rotational axis X. The centrifuge reactor 100 comprises a housing 110 having a sidewall 111 first housing end 112 and second housing end 113 that define a cavity 114. The first housing end 112 defines a first housing opening 115 and the second housing end 113 defines a second housing opening 116 at the first and second ends 101 and 102 of the centrifuge reactor 100 respectively.

The centrifuge reactor 100 further comprises a centrifuge assembly 150 that is rotationaly disposed within the cavity 114 of the housing 110 and configured to rotate about the central rotational axis X. In some embodiments, the cavity 114 can be air-cooled and/or hold a partial vacuum, which can be desirable for reducing drag losses as the centrifuge assembly 150 rotates within the cavity 114. The centrifuge assembly 150 can comprise a liner 551 (e.g., comprising stainless steel) an insulation shell 552 (e.g., comprising fused quartz), a centrifuge shell 553 (e.g., comprising carbon fiber), hubs 554 (e.g., comprising carbon fiber), and bearings 555 (e.g., high-speed angular contact bearings). The centrifuge assembly 150 can define a reaction chamber 510.

In the example of FIG. 5, biomass can be introduced to the reaction chamber 510 of the centrifuge reactor 100 via a first channel portion 561 at the first end 101 of the centrifuge reactor 100 proximate to the first housing opening 115 that extends to the reaction chamber 510. Reaction products such as water and salts can exit the reaction chamber 510 and centrifuge reactor 100 via a first fraction channel 525 that extends from the reaction chamber 510 to the first end 101 of the centrifuge reactor 100 and proximate to the first housing opening 115. Reaction products such as hydrocarbons (e.g., gasoline) can exit the reaction chamber 510 and centrifuge reactor 100 via a second fraction channel 530 that extends from the reaction chamber 510 to the first end 101 of the centrifuge reactor 100 and proximate to the first housing opening 115.

The centrifuge reactor 100 can further comprise a combustion system 530, that comprises a gas inlet 531 within the reaction chamber 510 (e.g., for carbon dioxide and medium density gasses such as methane) that leads to a pressure regulator valve 532 that directs gas to a combustion chamber 533, with combustion products leaving the system via an exit port 534 and with air being introduced to the combustion chamber 533 via an air inlet 535. One or more cartridge heaters 580 and sensors 585 can be located in a non-rotating section that is coincident with the central rotation axis X. The combustion chamber 533 and/or heaters 580 can be configured to generate heat, which can heat the reaction chamber 510 and reactants, precursors and the like, which in various embodiments can drive desirable reactions. The various embodiments, the combustion chamber 533 and/or heaters 580 can be configured to generate a heat gradient within the reaction chamber 510. For example, material within the reaction chamber 510 that is closer to the centrally-located heated combustion chamber 533 and/or heaters 580 can allow for material in the reaction chamber 510 that is closer to the heated combustion chamber 533 and/or heaters 580 to be hotter than material in the reaction chamber 510 that is at peripheries of the reaction chamber 510.

The centrifuge reactor 100 can further include a cooled fractional distillation column 590, which can provide for heavy hydrocarbons being drained back into the reaction chamber 510. The centrifuge reactor 100 can include mechanical pressure measurement and regulation spool valves 570 that can act via push rods 575 that extend along the central rotational axis X.

Figure 6:
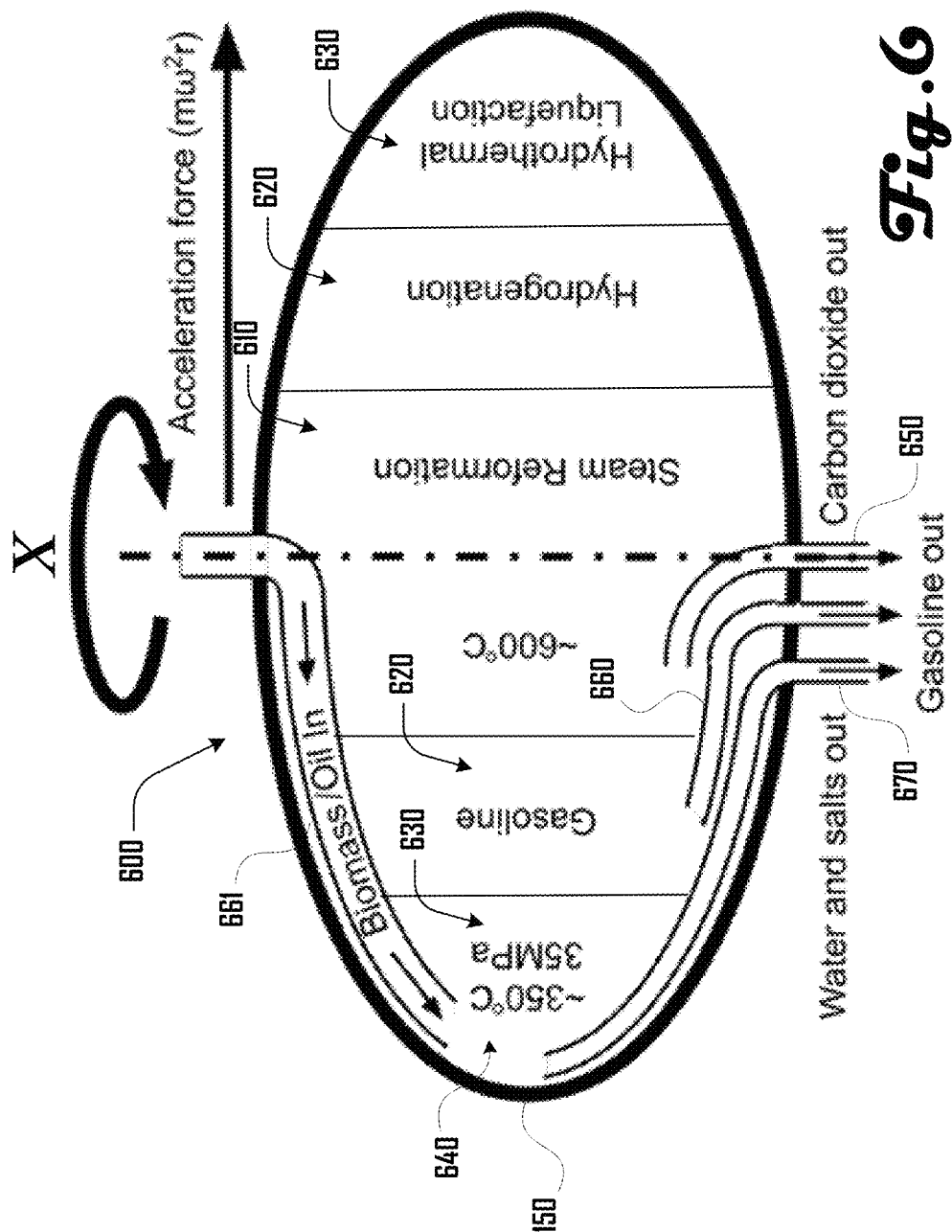

A motor 590 can drive the centrifuge assembly 150 to rotate about the central rotational axis X, which as discussed herein, can generate an acceleration gradient that acts of reactants, precursors, products, and the like, disposed within the reaction chamber 510. FIG. 6 illustrates an example of separation or fractions and conditions that can be generated in the reaction chamber 510, which can include, precursors, reactants, products, byproducts, and the like.

As shown in the example of FIG. 6, an acceleration can generate separations or fractions or portions 600 including a first central portion 610, which can comprise gasses such as hydrogen, carbon dioxide, methane, and the like. In various embodiments steam reformation can occur within the central portion 610 at a temperature of about 600° C., or the like. For example, a centrally located combustion chamber 533 and/or heaters 580 (see FIG. 5) can be configured to generate heat that heats material in the first central portion 610 to a temperature of about 600° C., or the like.

The separations or fractions or portions 600 can further include a second portion 620 that can comprise hydrocarbons (e.g., gasoline). In various embodiments, hydrogenation can occur within the second portion 620. The separations or fractions or portions 600 can further include a third peripheral portion 630 where hydrothermal liquefaction can occur at a pressure of 35 MPa and at a temperature of about 350° C., or the like.

As shown in the example of FIG. 6, precursor materials such as biomass and/or oil can be introduced to a reaction chamber 640 via a first channel portion 661 that extend from the central rotational axis X to a peripheral portion of the reaction chamber in the third peripheral portion 640. Material within the first, second and third portions 610, 620, 630 can be removed from the reaction chamber 640 via a respective first, second and third line 650, 660, 670. For example, carbon dioxide can be removed from the first portion 610 of the reaction chamber 640 via the first line 650; hydrocarbons such as gasoline can be removed from second portion 620 of the reaction chamber 640 via the second line 660; and water and salts dissolved in the water can be removed from the third portion 630 of the reaction chamber 640 via the third line.

Thermal depolymerization, sometimes referred to as hydrothermal liquefaction when water is present (e.g., pyrolysis in a pressure vessel), can replicate the natural process by which fossil fuels are created in terms of temperature, pressure, and time, but over a much shorter time span, which in some examples can be on the order of minutes. Supercritical operation, beyond 374° C. and 22 MPa, can also be implemented, which in some examples can be less feed stock sensitive, enabling higher conversion rates, and having faster reaction times.

In some embodiments the process can be practiced in a continuous flow manner, which can begin by reducing raw feedstock to a very small particle size and mixing the raw feedstock with water of a sufficient quantity such that the water and feedstock can be pumped to high pressure (e.g., via valved hydraulic pumps, or the like). In some examples, feedstock can be liquid, solid, or a gas. In various embodiments, a solid feedstock can be combined with oil, water, and/or liquid flowing back out of the centrifuge reactor 100 such that the feedstock becomes a slurry. Added water can increase the size of a centrifuge reactor 100, so dry feedstock can be desirable in various embodiments. Such dry feedstock can flow within the centrifuge reactor 100 with sufficient acceleration and lubrication (e.g., via oil produced in the centrifuge reactor 100) can further facilitate the flow of dry feedstock in the centrifuge reactor 100.

Once at pressure, the feedstock can be heated to a desired temperature and held at that temperature for a few minutes. It can then be cooled and depressurized. Pressure, temperature and residence time can be parameters that can be varied in order to tune the process to different feed stocks and to bias the reaction towards preferred reaction products. Higher pressures and temperatures, and shorter residence times, tend to favor oil production in some embodiments.

Centripetal hydrothermal liquefaction can include use of a centrifuge reactor 100 to pressurize the wet biomass stream in a continuous flow process. Continuous flow operation of some examples can greatly increase the system output and reduces costs, which can allow the system to become highly compact. In some embodiments, a centrifuge reactor 100 can function like an inverted siphon and the work required to pressurize the waste stream can be directly recovered when one or more fluid stream flows out of the centrifuge reactor 100.

For example, in some examples, a centrifuge assembly of a centrifuge reactor 100 can generate a conservative angular acceleration field with the only power added being that required to overcome bearing and air friction. As such, in some examples, no net pumping power may be required to pressurize a wet biomass stream (beyond negligible flow losses). The elimination of this pumping power can greatly increase the overall system efficiency and can substantially reduce costs in some embodiments. Further, in examples where there are no hydraulic pistons or valves, feedstock particle size may not be critical and the feedstock particle size merely needs to be small enough as to be able to flow through the centrifuge piping without blockage. These flow paths can be relatively large in diameter, especially in embodiments having larger unit sizes.

A continuous centripetal flow process can also enable the integration of external insulation and highly-effective counter flow heat exchangers which can enable the efficient recovery of thermal energy. With these one or both capabilities, in some embodiments, very little net energy, either mechanical or thermal, needs to be added to accomplish hydrothermal liquefaction. The conversion of lignin-cellulosic material to liquid hydrocarbons and carbon dioxide can be slightly net exothermic in some examples. A centrifuge reactor of various embodiments can be considered as something of a thermally insulated black box where feedstock energy in must necessarily equal the chemical and thermal energy of the products coming out. Beyond start-up, ideally no external energy input is required in some examples.

A centrifuge can be used for integral separation of reaction products via their different densities. This can occur within the reaction chamber itself such that chemical reactions can be biased in favor of desired reaction products, creating dynamic chemical feedback loops. Undesired reaction products can be recycled through the hydrothermal liquefaction process and, in some examples, exposed to different temperatures, pressures, and residence times so as to further encourage desired reaction products. More elaborate chemical reaction processes can also be directly integrated into the centrifuge, for example, Haber Bosch ammonium nitrate (fertilizer) production. Many desirable chemical reactions occur at elevated temperature and pressure and a centrifuge reactor 100 can be configured to operate at such temperatures and pressures.

The parameter space of a centrifuge reactor 100 can have sufficient dimensions as to make it difficult to easily represent in a two dimensional drawing. Temperature, pressure, and time can be the primary dimensions, though to these can also be added density fractionation, separation, heat transfer, mixing, and catalytic reactions, with associated feedback loops, and this all can occur within a high acceleration rotating frame of reference. Multiple examples illustrations are presented herein from different perspectives so as to better encompass such a many-dimensional design space.

Figure 7:
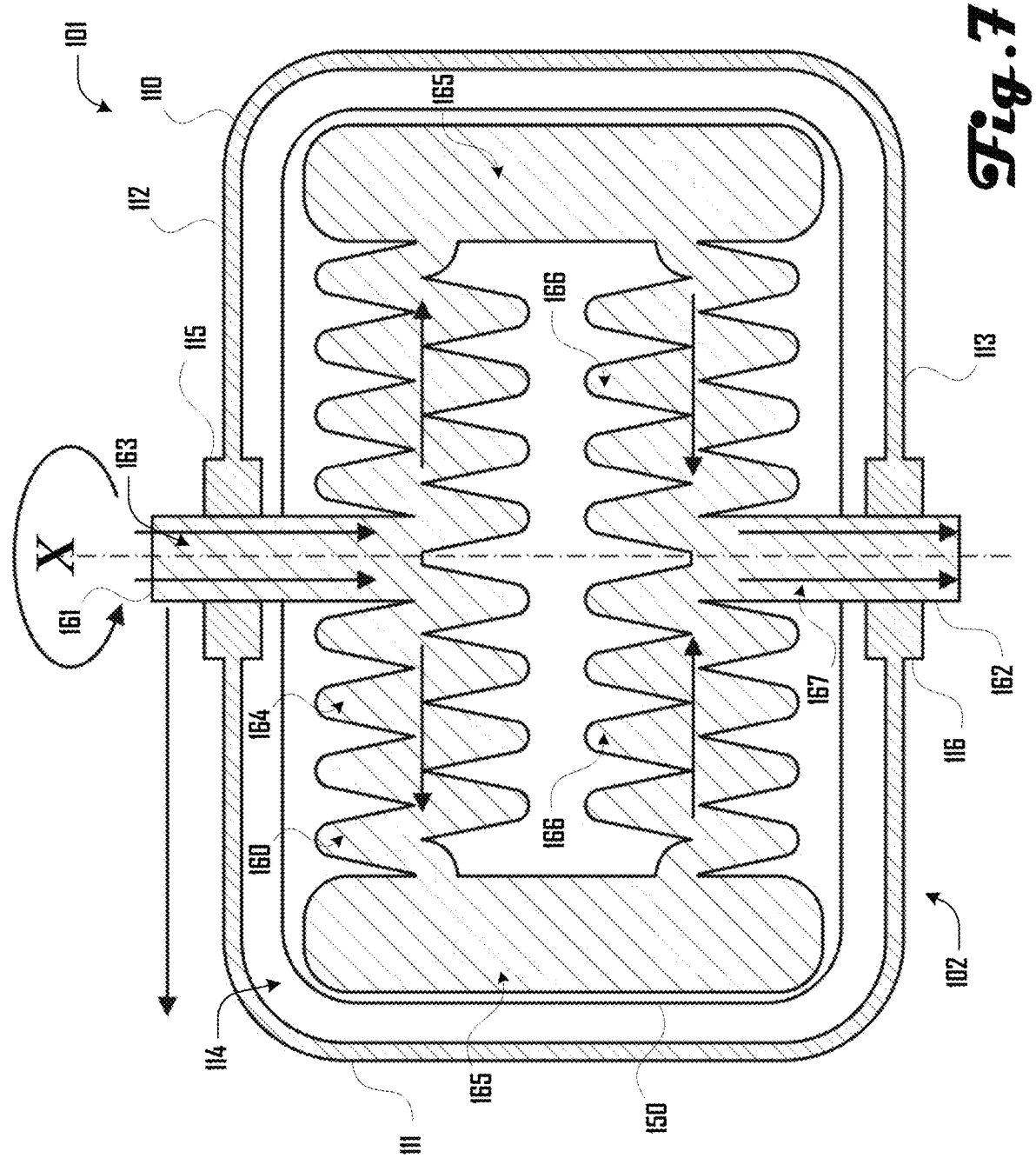
FIG. 7 illustrates a side cross-sectional view of another example embodiment of a centrifuge reactor.

FIG. 7 illustrates a side cross-sectional view of another example embodiment of a centrifuge reactor 100 having a first end 101 and a second end 102 with a central rotational axis X. The centrifuge reactor 100 comprises a housing 110 having a sidewall 111 first housing end 112 and second housing end 113 that define a cavity 114. The first housing end 112 defines a first housing opening 115 and the second housing end 113 defines a second housing opening 116 at the first and second ends 101 and 102 of the centrifuge reactor 100 respectively.

The centrifuge reactor 100 further comprises a centrifuge assembly 150 that is rotationaly disposed within the cavity 114 of the housing 110 and configured to rotate about the central rotational axis X. The centrifuge assembly 150 defines a channel 160 that extends and folds within the cavity 114 from a first channel opening 161 at the first end 101 of the centrifuge reactor 100 to a second end 162 at the second end 102 of the centrifuge reactor 100.

As shown in the example embodiment of FIG. 1 the channel 160 comprises the channel opening 161 that opens to an entry portion 163, that extends to a first channel portion 164 that extends perpendicular to the axis X and along to the first housing end 112 at the first end 101 of the centrifuge reactor 100. The channel 160 continues by curving to a second channel portion 165 that extends along the sidewall 111 from the first end 101 to the second end 102 parallel to the axis X. The channel 160 continues by curving to a third channel portion 166 that extends toward and perpendicular to the axis X along the second end 102 of the centrifuge reactor 100. The channel 160 continues to a channel exit shaft portion 167 that extends along the axis X and out the second housing opening 116 at the second end 102 of the centrifuge reactor 100.

Various portions of the channel 160 can act as a reaction chamber in accordance with some embodiments. For example the second channel portion 165 can comprise a reaction chamber. The centrifuge reactor 100 can operate at various suitable pressures as discussed herein including 5-30 MPa, 5-10 MPa, and the like.

In various examples, pressure in a centrifuge assembly 150 can be given by:

$$p = \frac{1}{2}\rho(v_2^2 - v_1^2) - \frac{1}{2}\rho\omega^2(r_2^2 - r_1^2) \quad (1)$$

Where ρ is the fluid density, $v_2$ is the tip tangential speed, $v_1$ is the inlet tangential speed, ω is the rotational speed, $r_2$ is the centrifuge tip radius, and $r_1$ is the inlet radius. For water, a tip pressure of 5 MPa can be achieved with a tip speed of 100 m/s (224 mph), which can be well within the material limits of common steel. While the centrifuge material stress can be a function of specific geometry, for comparison, the tensile hoop stress of a spinning rim can be a direct function of specific strength and tip speed and as given by:

$$\sigma/\rho m = v^2 \quad (2)$$

Where v is the tangential speed and $\rho_m$ is the material density. By utilizing high strength composite materials and high taper ratios, tip speeds above 1000 m/s are possible, and fluid pressures in excess of 500 MPa, but such high pressures are not required. Hence, practically speaking, centripetal hydrothermal liquefaction is not pressure limited in various examples.

A variant of this conservative acceleration field-based hydrothermal liquefaction system can be to use gravity instead of centripetal acceleration:

$$p = \rho g h \quad (3)$$

Where g is gravity, and h is the height. Hence, a water pressure of 5 MPa requires a head of 510 meters in various embodiments. This can be a much larger physical system than the centripetal case, but it can have some technical benefits in various examples and can provide a more intuitive path to understanding the general concept. For example, such a system could be situated on the side of a hill, in a very tall tower, or down a deep well (e.g., an old oil well). Indeed hydrothermal liquefaction can occur by pumping bio-waste down existing oil wells.

Figure 8:
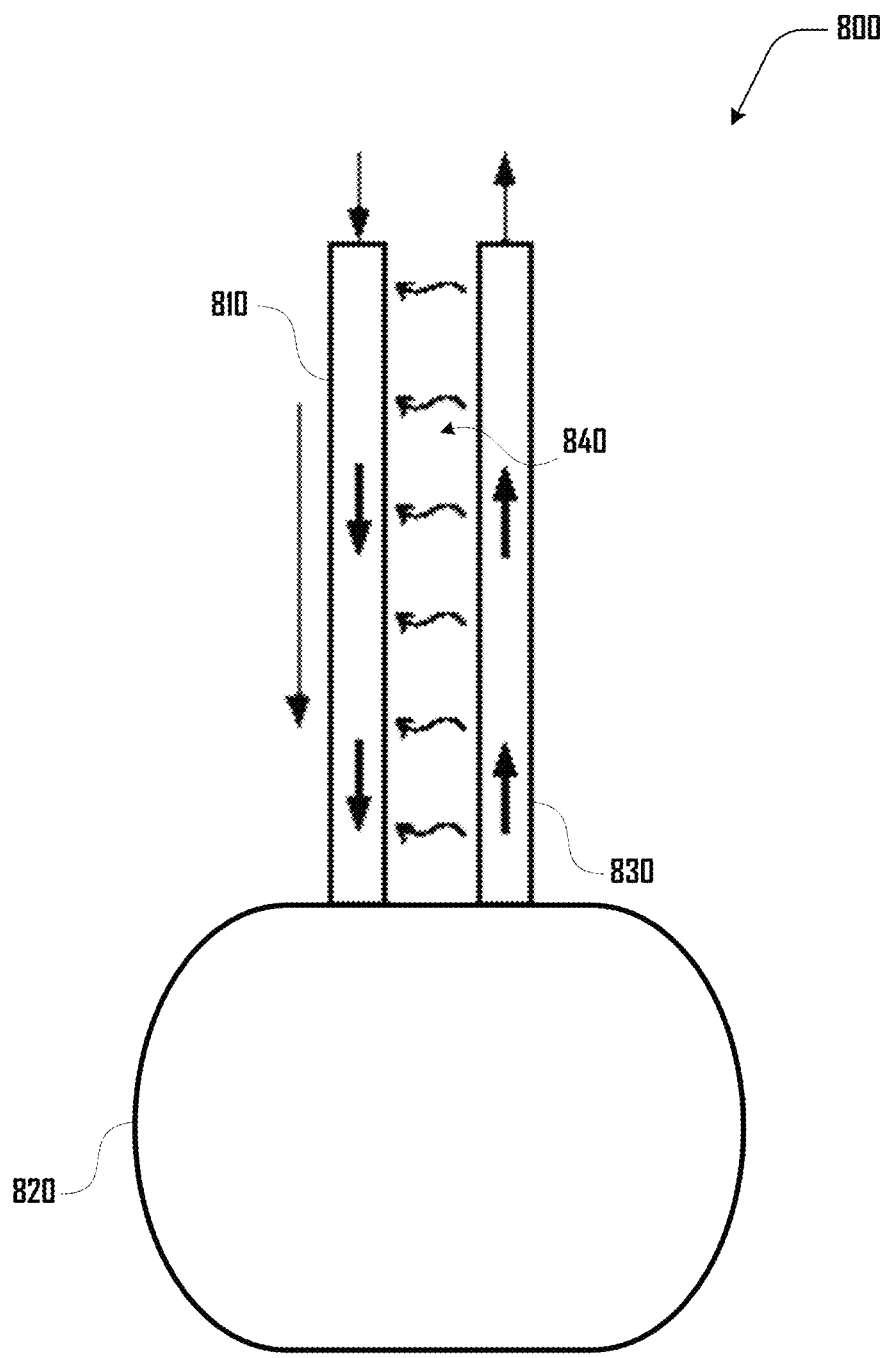
FIG. 8 illustrates one example of a gravity pressurization hydrothermal liquefaction system that comprises an entry channel that leads to a reaction chamber and an exit channel that extends from the reactions chamber.

For example, FIG. 8 illustrates one example of a gravity pressurization hydrothermal liquefaction system 800 that comprises an entry channel 810 that leads to a reaction chamber 820 and an exit channel 830 that extends from the reactions chamber 820. In various embodiments, a precursor such as biomass can be introduced into the reaction chamber 820 via the entry channel 810 and a thermal depolymerization reaction can occur within the reaction chamber 820 and products and/or biproducts (e.g., methane, oil, water, solids, salts, and the like) can leave the reaction chamber 820 via the exit channel 830. Counter flow heat recovery can occur between the channels 810, 830 via an interface 840 between the channels 810, 830. The channels 810, 830 can be various suitable lengths/heights (e.g., 500-2500 meters). The thermal depolymerization reaction can occur under various suitable conditions, such as 5-25 MPa, 250° C.-550° C., and the like. Reaction times can be 20, 25, 30, 35 minutes, or the like.

High temperature operation (e.g., in excess of a 1000° C.) can be present in some embodiments. This can require one or more of active cooling of the centrifuge structure, (e.g., via a liquid water cooling loop), and suitable materials selection for the reaction chamber walls and, in some examples, the judicious use of high-strength high-temperature insulating materials. Counter flow heat exchanger design, specifically materials selection, can be more challenging at these higher temperatures and stresses in some examples, although this generally does not prevent operation at these higher temperatures, just the efficient heat recovery thereof.

Some hydrothermal liquefaction systems, can yield efficiencies of 85%, with the pumping power requirement negated. Accordingly, in various examples, centripetal hydrothermal liquefaction via a centrifuge reactor 100 can be more efficient because pumping power is negated. Centripetal hydrothermal liquefaction can achieve yet higher efficiencies than this in some embodiments. In comparison, corn based ethanol energy yields, as a proportion of total plant energy content, can be on the order of 10%, although there can be significant commercial value in byproducts and the ethanol can be in a high value liquid fuel form.

The feedstock can be of a form that can physically be introduced into the centripetal hydrothermal liquefaction system. Trees, for example, may need to be broken down to a size that can be physically introduced into the intake. This can push towards larger unit sizes for forestry waste processing. Reducing the energy required to break down the raw feedstock to a characteristic size suitable for processing (e.g., chipping) can be desirable in some examples.

TABLE 1

Average Thermal Depolymerization (TDP) Feedstock Outputs

| Feedstock | Oils | Gases | Solids | Water |
|---|---|---|---|---|
| Plastic bottles | 70% | 16% | 6% | 8% |
| Medical waste | 65% | 10% | 5% | 20% |
| Tires | 44% | 10% | 42% | 4% |
| Turkey offal | 39% | 6% | 5% | 50% |
| Sewage sludge | 26% | 9% | 8% | 57% |
| Paper (cellulose) | 8% | 48% | 24% | 20% |

Agricultural wastes may generally be physically much smaller with lower structural integrities, and can be much easier to handle in some examples. Once the feedstock has been thermally depolymerized, the structural integrity can be greatly reduced such that it will tend to break up.

Different feedstocks can produce different reaction products via a hydrothermal liquefaction process; however, upgrading may then be possible with produced gases used to drive steam reforming and hydrogenation. Carbon solids can be oxidized, hydrogenated, and generally minimized in some embodiments. Operating hydrogen rich, and preferably somewhat acidically, helps minimize coking and the production of aqueous organic products in some examples, especially if combined with aggressive carbon dioxide removal and water separation.

One of the side benefits of hydrothermal liquefaction can be that it can also serve to sterilize waste streams. However, some waste streams can have contaminates that may need to be separated. For example, sulfur can be a significant trace element in many plant based feedstocks, and may need to be removed from the resultant hydrocarbon fuels. Conventional separation systems as used for the fossil fuel industry can be used, however, in some examples it can be desirable to remove sulfur as an aqueous salt and directly return it to the soil as a fertilizer. For municipal waste feedstocks the residues can pose greater disposal difficulties, especially if heavy metals are present, although they can potentially become a minable source of useful minerals. Hydrothermal liquefaction can become a useful process for removing and concentrating undesirable contaminates which might then be more effectively separated. This can raise the question of what potentially undesirable emissions the centrifuge reactor might produce and how they might be managed.

Given a high effectiveness counter-flow heat exchanger, the external thermal energy input required to drive the centripetal thermal depolymerization process can be very small and potentially negative; however, it can depend somewhat on the extent of the endothermic and exothermic reactions involved. Startup of a reaction can require some external heat addition to get the reaction to temperature and the reaction temperature may need to be controlled. For example, a simple electric resistive heater can be used at start up and/or active water cooling can be used to control temperature and prevent overheating. Some power can be extracted from the centrifuge reactor via the high pressure gases produced, for example, a supercritical carbon dioxide turbine system. This can be used to power the centrifuge reactor and ancillary systems in some examples. In some examples, the addition of air to the feedstock may not necessarily increase heat production due to the formation of nitrates, although this could be a pathway to greater fertilizer production and increased liquid fuel yields, via reduced carbon dioxide production. Combustible gases can be extracted and burnt separately in various embodiments if additional heating is desired.

A housing 110 around a centrifuge assembly 150 can be thermally insulated so as to minimize thermal losses. Raising the temperature of the air within a cavity 114 of the housing 110 surrounding the centrifuge can reduce aerodynamic drag losses through reduced air density and can ensure that those aerodynamic losses are thermally recovered by the hydrothermal liquefaction process, although the cavity 114 defined by the housing 110 around the centrifuge assembly 150 can be partially evacuated so as to largely eliminate aerodynamic losses. Heat can be transmitted to the centrifuge assembly 150 via the air surrounding it if desired, which in some examples, can be useful during startup. In some embodiments, external methane or hydrogen injection or oxygen removal can increase yield. For example, external power sources can be employed to increase yield and reduce or even eliminate carbon dioxide production. This can be of use with respect to mitigating the intermittency of energy resources such as wind, solar and the like.

External aerodynamic losses from the centrifuge assembly 150 can be significant in some embodiments, though not prohibitive at atmospheric pressure; they can reduce proportionately with larger scale. Scales of some centripetal hydrothermal liquefaction systems can be from small fractions of a meter (perhaps used for household waste treatment or mobile applications), through to many tens of meters. Size of some embodiments can be driven by the necessary volume required to process the given waste stream over the desired residence time. Due to the high energy density of hydrocarbons, and relatively short residence times, small systems can potentially achieve very high throughputs in some embodiments. For example, a shipping container or back of a truck sized system in the ten ton range can process around ten tons of hydrocarbons per hour, potentially leading to revenue in excess of a ten million dollars per year. The capital cost of this base centripetal hydrothermal liquefaction system can be around one million dollars in some examples, depending on the construction and extent of additional processing and associated storage and handling. Operating costs can be very low and it can be a highly automated system requiring little maintenance. The centrifuge reactor 100 might cost around $100/kg, with the raw cost of Inconel and carbon fiber being around $25/kg. Inconel, as used in gas and steam turbine blades, can sustain the temperatures can be around ten times heavier than carbon fiber. However, carbon fiber for the pressure vessel and centrifuge structure may need to be actively cooled in some embodiments. A water cooled carbon fiber structure can be used in some examples.

At 5 MPa, the boiling point of water is 263.9° C., hence water will still be in the liquid phase inside of the centrifuge assembly 150 at these temperatures and pressures. The critical point of water is at 374° C. and 22.1 MPa. Charcoal, oil, and methane are all generally less dense than water, and they may naturally float within the centrifuge assembly 150, while some tars, carbon solids, metals, and metal oxides, can be more dense than water. Water can be independently siphoned off, controlling the water proportion inside the centrifuge assembly 150. Water can be a critical part of the hydrothermal liquefaction reaction in various embodiments, which can mean that the process can utilize wet biomass as a feedstock. Energy intensive drying of the feedstock may not be required in some examples, although excess water can increase the required reactor volume and heat exchangers proportionately. Water recovered from the centripetal hydrothermal liquefaction process can be purified, for example via a distillation process, and salts can be removed. Carbon and hydrocarbon contaminates can be recirculated back through the hydrothermal liquefaction process for reprocessing in some examples.

With reference to a hydrothermal liquefaction only case, gas produced by the process can be at high pressure at the tip of the centrifuge.

TABLE 2

Example Reaction Products

| Reaction products | Temperature | Pressure | Time |
|---|---|---|---|
| Char mostly | 170-250° C. | 0.1-5 MPa | 4-15 hours |
| Oil mostly, high oxygen content | 250-350° C. | 5-20 MPa | 15 minutes |
| Methane and $CO_2$ | 350-380° C. | 18-30 MPa | |
| Hydrogen, methane and $CO_2$ | 600-700° C. | 25-30 MPa | 15 minutes |

In various embodiments, reaction products can be allowed to exit the centrifuge reactor 100 through a main liquid flow path, decreasing in pressure as it does so, and with its high buoyancy helping to drive the flow, or it can be separated off at the tip and allowed to exit through its own flow path, which can maintain its high pressure. In the latter case the pressurized gas can be passed on at high pressure to additional processes, or it can be expanded through a turbine, or equivalent, generating net power in various examples. A centripetal hydrothermal liquefaction system of some embodiments can in part function as a low temperature Rankine cycle power plant, if desired, utilizing hydrocarbon gases or even steam. As a steam generator, heat can be extracted from the centrifuge reactor, perhaps helping to control excessively exothermic reactions.

Multiple passes through a centripetal hydrothermal liquefaction system can be used for some products, to further breakdown or bias the reaction products. Different runs can be performed at different temperatures and pressures. Accumulated salt precipitates that are denser than water, and which might collect in the centrifuge tip, can be flushed out between runs. Methods for the continuous extraction of dense precipitated salts can be integrated into the centrifuge. Specialist centrifuges for yet higher temperature and pressure processing of hydrocarbon products can be useful in some cases.

A centrifuge based chemical reactor can be used for integral separation of reaction products of differing densities—as per a centrifuge separator. Further, this can occur in stages and at different temperatures and pressures, enabling separation of otherwise comparable density fluids. Not only can this be useful in the direct sense, but it can also be used to actively bias chemical reactions by preferentially removing desired reaction products. Le Chatelier's principle can then be exploited to re-balance the overall chemical reaction in the direction of the removed reaction products. This can significantly increase the yields of desired reaction products while reducing the yields of less desired reaction products in some embodiments. For example, this effect can be used to increase the oil yield, and more specifically, increase the oil yield within a given density range, like higher value lighter oil grades. Separation of carbon dioxide can be useful with respect to biasing overall reactions in some examples and can be the primary method of oxygen removal and thereby liquid fuel upgrading.

Figure 9:
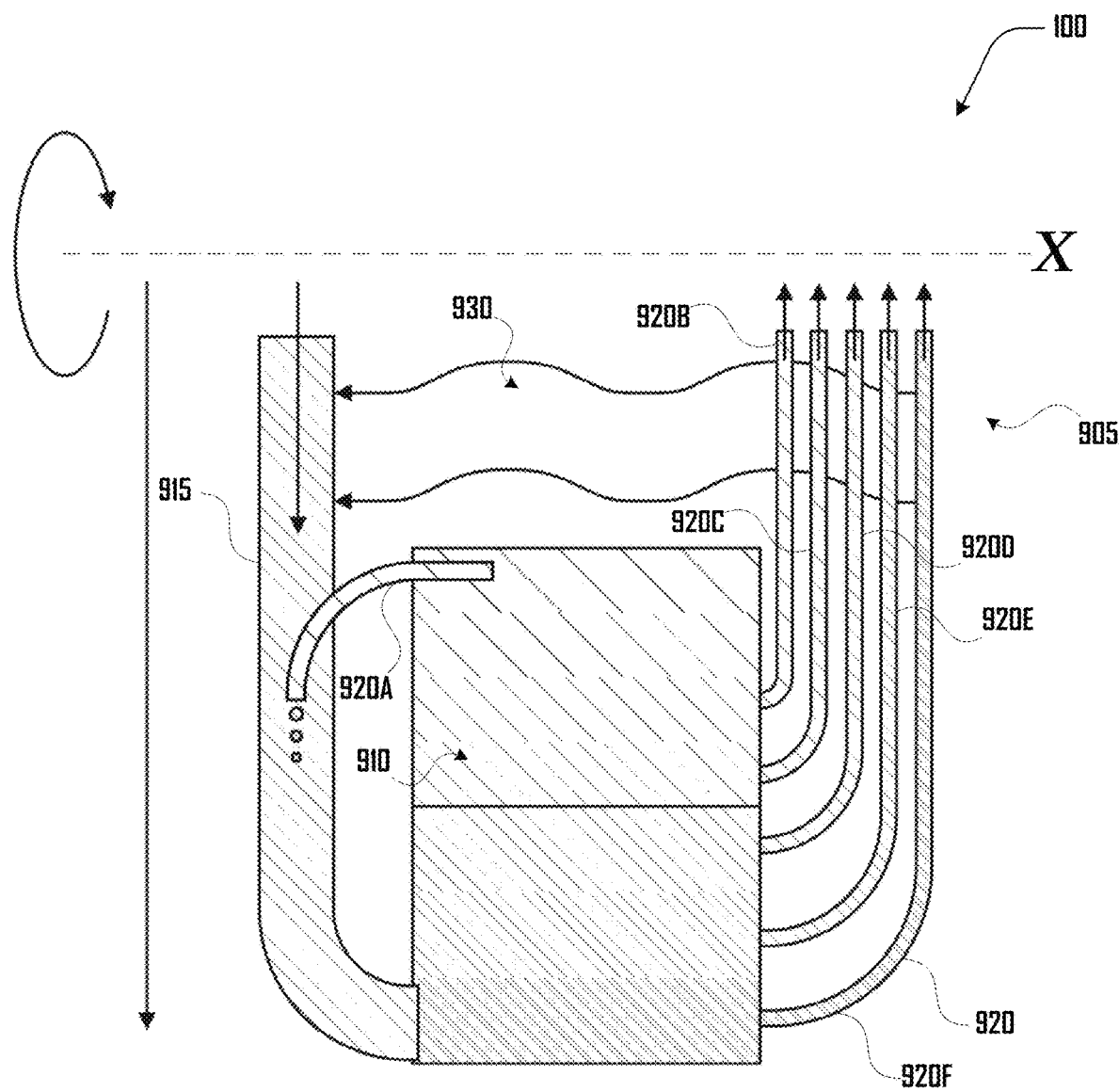
FIG. 9 illustrates an example of separation of products in a centrifuge assembly of a centrifuge reactor including introduction of starting material(s) and removal of various separations for fractions from a reaction chamber including removal from centrifuge reactor and/or being fed back into a reaction flow of the centrifuge reactor.

FIG. 9 illustrates an example of separation of products in a centrifuge assembly 905 of a centrifuge reactor 100 including introduction of starting material(s) and removal of various separations for fractions from a reaction chamber 910 including removal from centrifuge reactor 100 and/or being fed back into a reaction flow of the centrifuge reactor 100. As shown in FIG. 9, biomass or other starting material can be introduced into the reaction chamber 910 via an entry channel 915. The reaction chamber 910 can rotate about the central rotational axis X, which can generate a separation of reaction products within the reaction chamber 910.

For example, as shown in FIG. 9, the separation can include hydrogen, methane, water, carbon dioxide, light oil, medium oil and heavy oil. A plurality of lines 920 can be positioned at locations about the reaction chamber 910 such that the lines can withdraw various separations or fractions or reaction products from the reaction chamber 910. For example a first line 920A can be positioned to remove hydrogen and methane from the reaction chamber 910. A second line 920B can be positioned to remove carbon dioxide; a third line 920C can be positioned to remove heavy gases; a fourth line 920D can be positioned to remove light oil; a fifth line 920E can be positioned to remove heavy oil; and a fifth line 920F can be positioned to remove water and dissolved salts. In various embodiments, thermal heat recovery can occur at an interface 930 between one or more of the lines 920B-F and the entry channel 915.

In various embodiments, integral separation, recycling of reaction products, reaction biasing, re-entrainment of gases, mixing, hydrogenation, and so forth, can all be possible within a single reaction chamber 910. In some embodiments, multiple reaction chambers 910 operating at different temperatures and pressures performing different functions can be directly integrated together. Pressure and density profiles can be actively measured, mapping the quantities of different constituents, and active flow valves can be used to regulate those quantities.

Instrumentation that measures the pressure profile within the reaction chamber 910 can be used to directly assess the quantity, identity, and stratification of different fluids, including different hydrocarbons, within the reaction chamber 910. The lines 920 at different centrifuge radii, combined with active valve control, can then be used to separate these fluids, and if desired, pass them to different locations within the centrifuge assembly 905, or pass them out of the centrifuge reactor 100 entirely.

Figure 10:
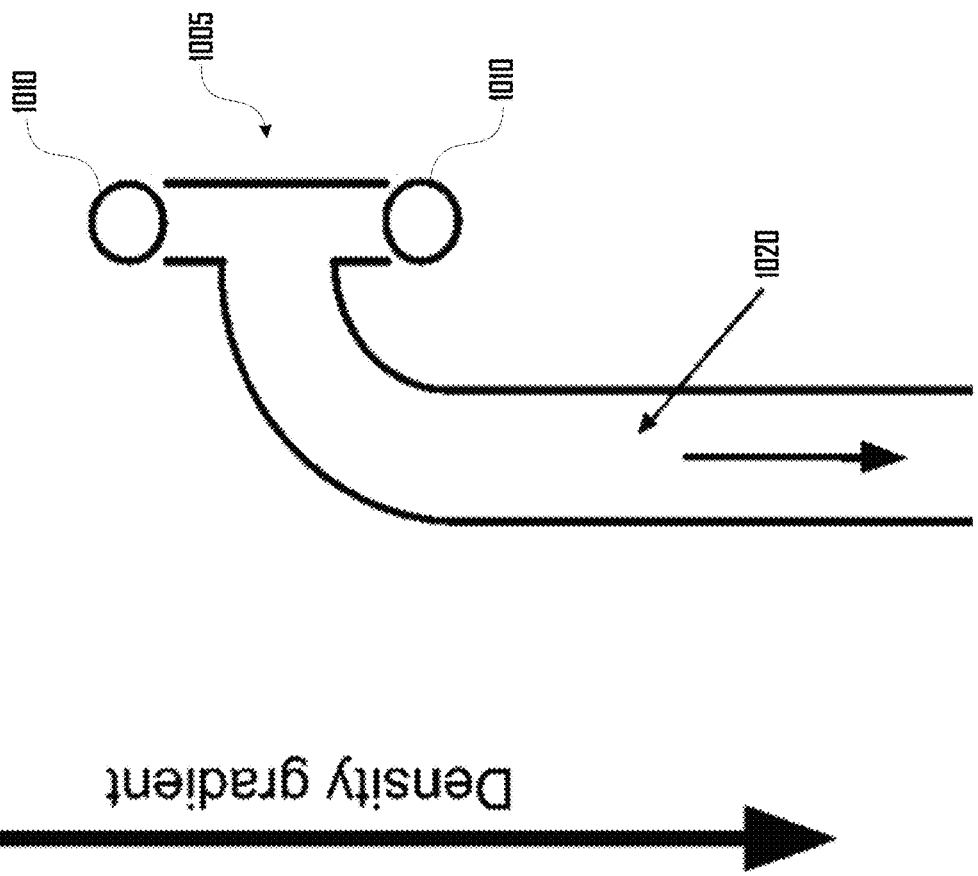
FIG. 10 illustrates an embodiment of a separator assembly that comprises a pair of float valves that only allows passage of a fluid of a given density, which can allow passive control of a fractional column.

Given the very high acceleration environment in some embodiments, (e.g., ~10,000 gravities), passive separation via float valves is also possible with high precision. For example FIG. 10 illustrates an embodiment of a separator assembly 1005 that comprises a pair of float valves 1010 that only allows passage of a fluid of a given density, which can allow passive control of a fractional column. Various embodiments can include one or more float valve 1010 tuned to a specific density and used to control the fractionation column.

Figure 11:
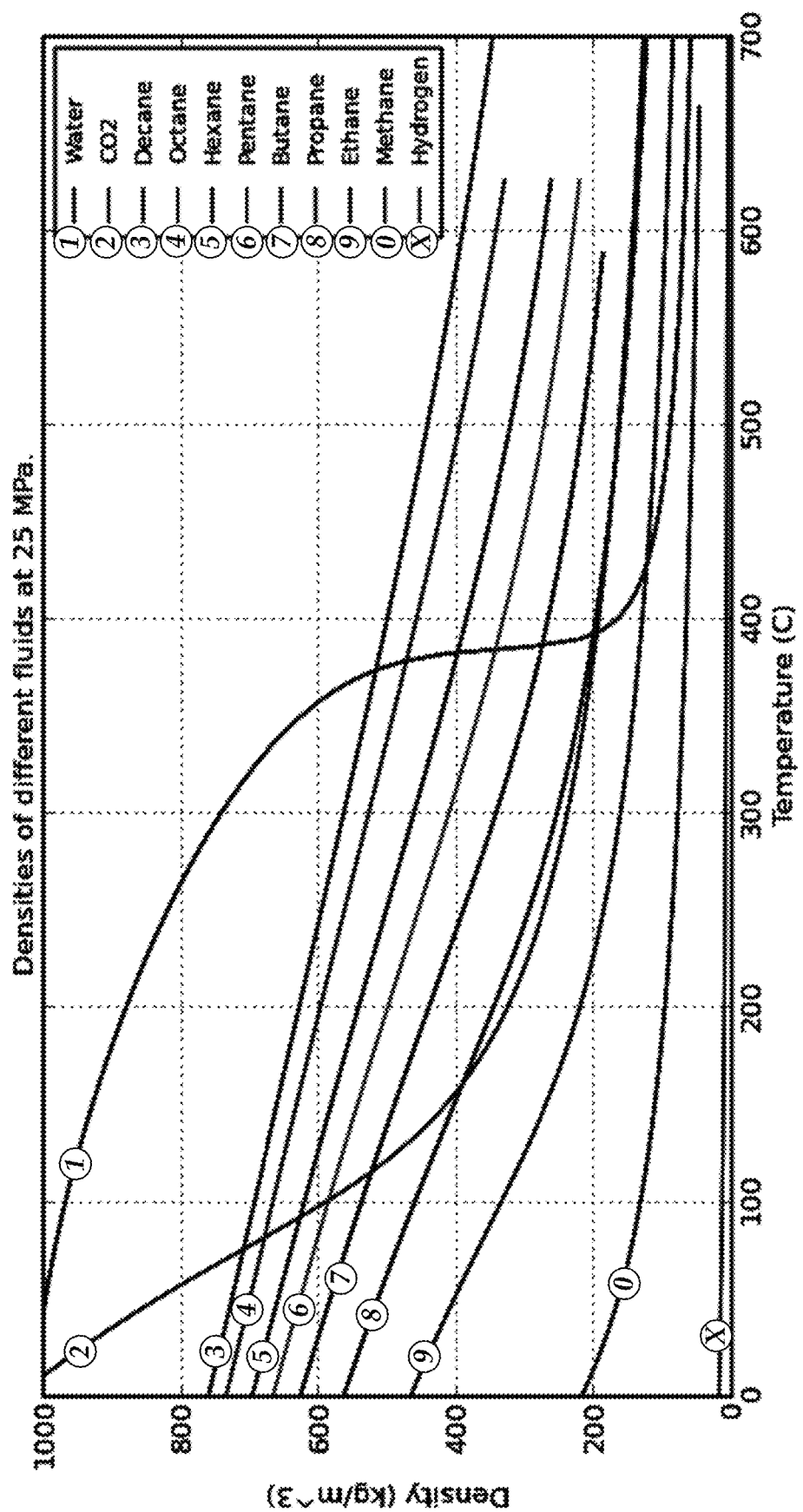
FIG. 11 illustrates an example graph of the density of various compounds by temperature at 25 MPa.
Figure 17:
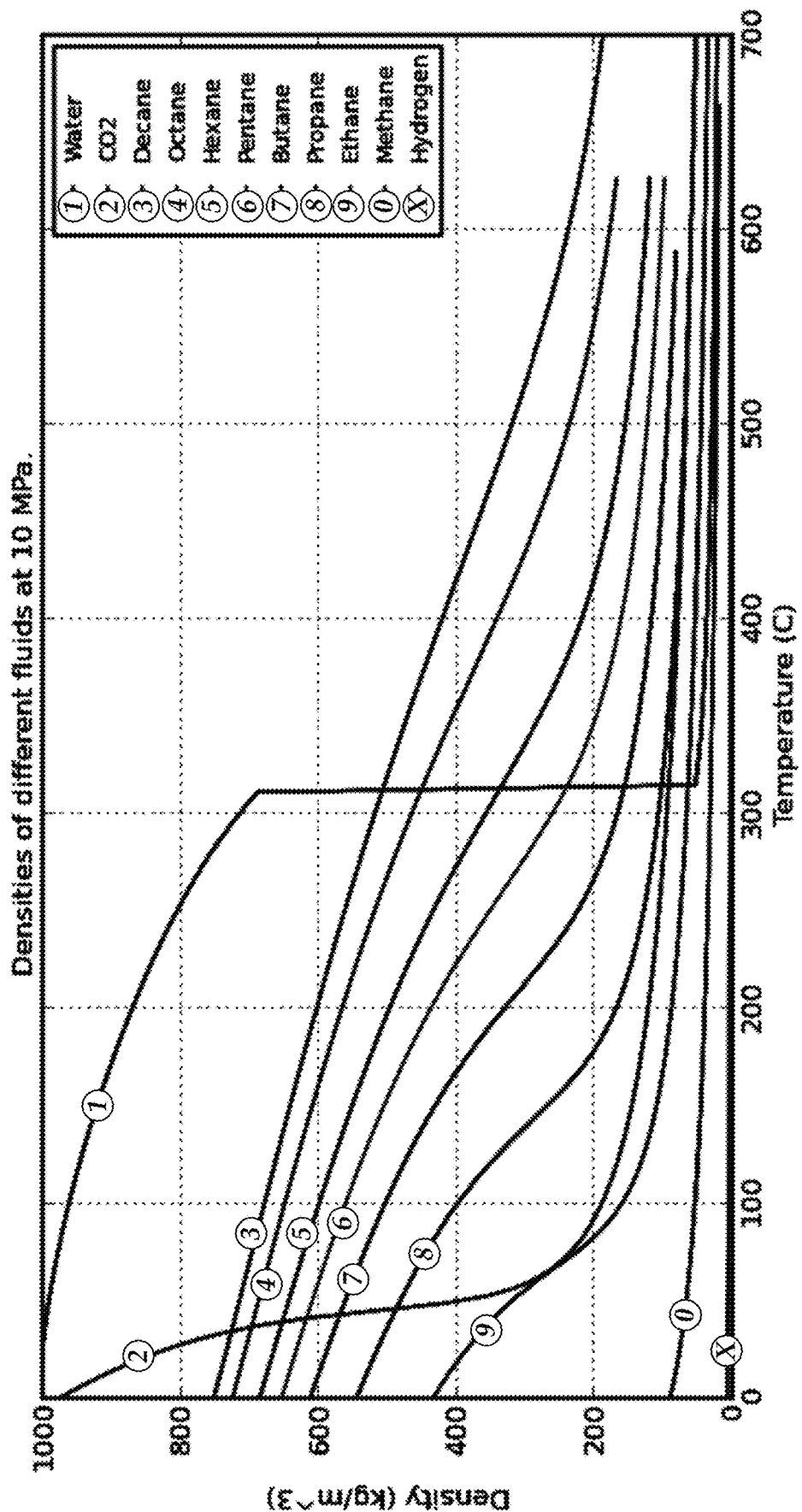
FIG. 17 illustrates an example graph of the density of various compounds by temperature at 10 MPa.
Figure 18:
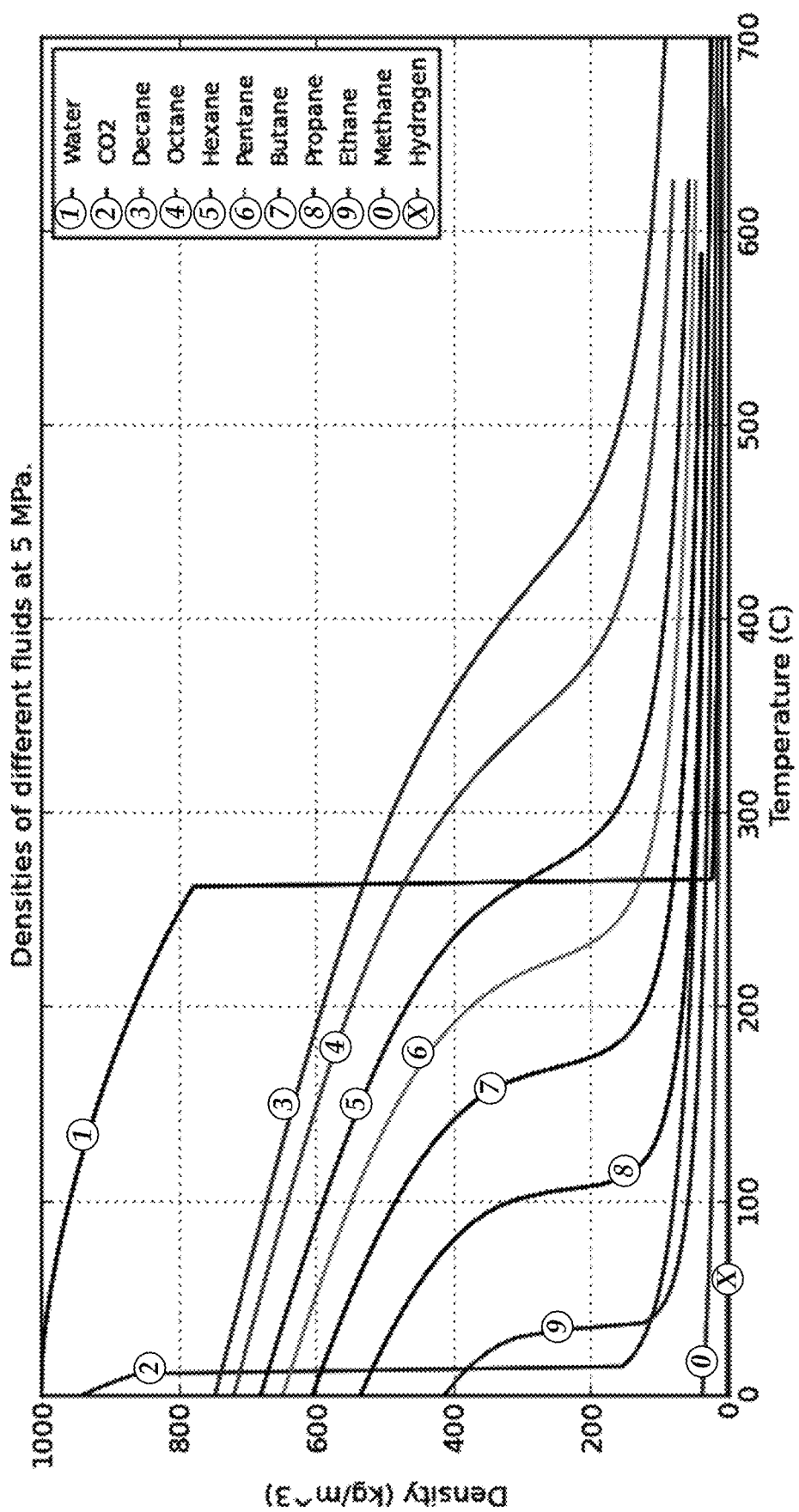
FIG. 18 illustrates an example graph of the density of various compounds by temperature at 5 MPa.

As discussed herein, a centrifuge reactor 100 can be used to separate fluids by density, which can vary with temperature. For example, FIG. 11 illustrates an example graph of the density of various compounds by temperature at 25 MPa. FIGS. 17 and 18 illustrate example graphs of the density of various compounds by temperature at 10 MPa and 5 MPa respectively. Exploiting non-linear properties around critical points is one example method of separating similar fluids. For example, $CO_2$ and water might be more easily separated below their critical point and solubilities may also change significantly around a critical point.

Figure 12:
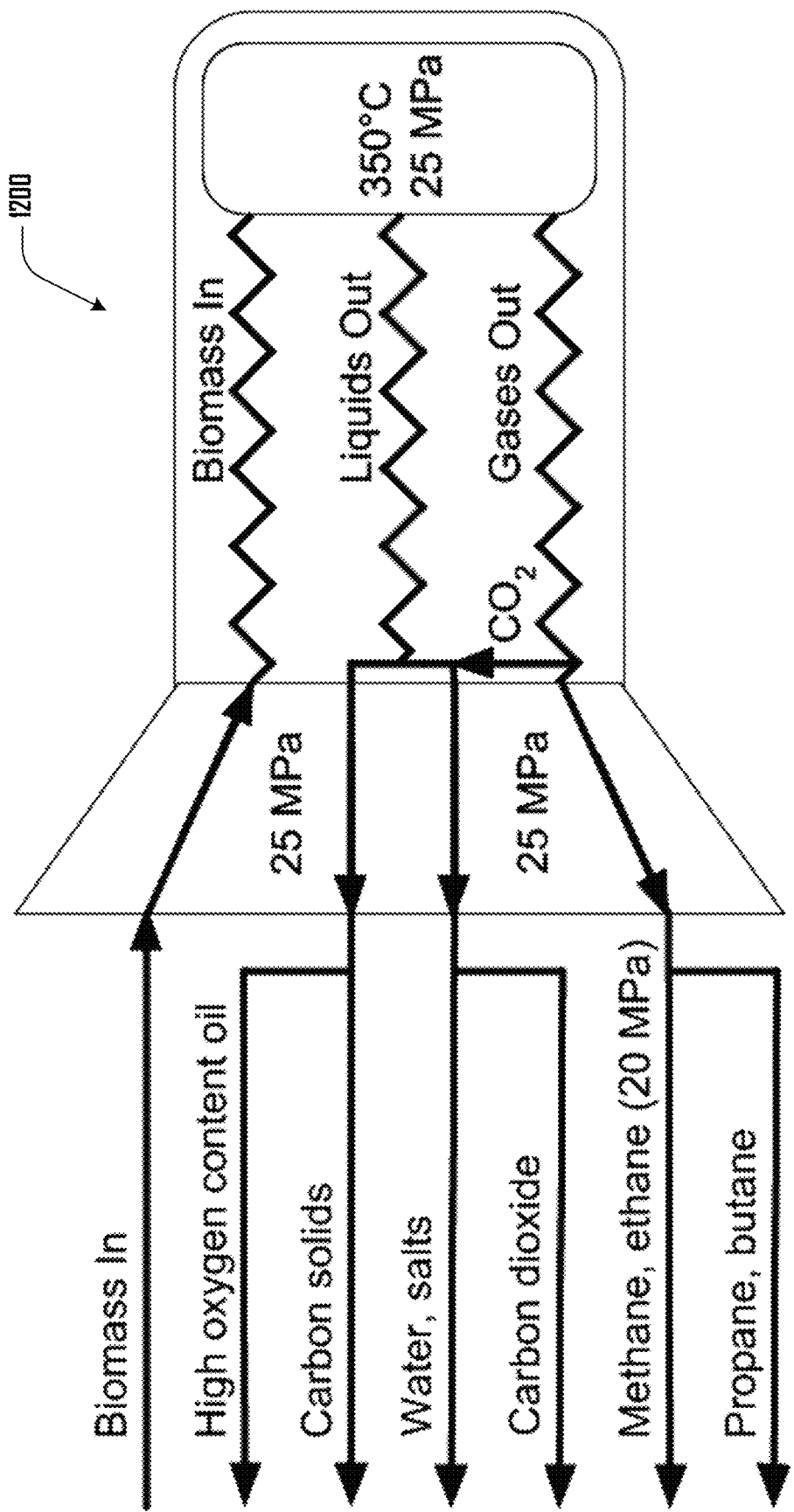
FIG. 12 depicts an example thermal depolymerization or hydrothermal liquefaction with a centrifuge reactor.

FIG. 12 depicts an example thermal depolymerization or hydrothermal liquefaction with a centrifuge reactor 100. This example can be a relatively simple low temperature design—subcritical with respect to water. This can be used directly to create low quality oil (high oxygen content), which might then be further processed. This system can be mobile in some examples and the resultant carbon solids and low grade oils, and high pressure gases (at compressed natural gas pressures), can then be used directly or transported to a more centralized refinery for further processing. The process can also be optimized to produce biochar and high pressure hydrocarbon gases that might be used directly without further refinement. One of the functions of this first stage reaction, in some examples, can be to remove the majority of the water content and impurities, such as salts, that can be directly returned to the earth as fertilizer. Nitrate production within this reaction chamber might be actively encouraged (Haber Bosch). In various embodiments, subcritical operation can allow for first stage processing of minimally cut raw biomass, breaking it down. This can be a classic hydrothermal liquefaction, including water and carbon dioxide separation.

Figure 13:
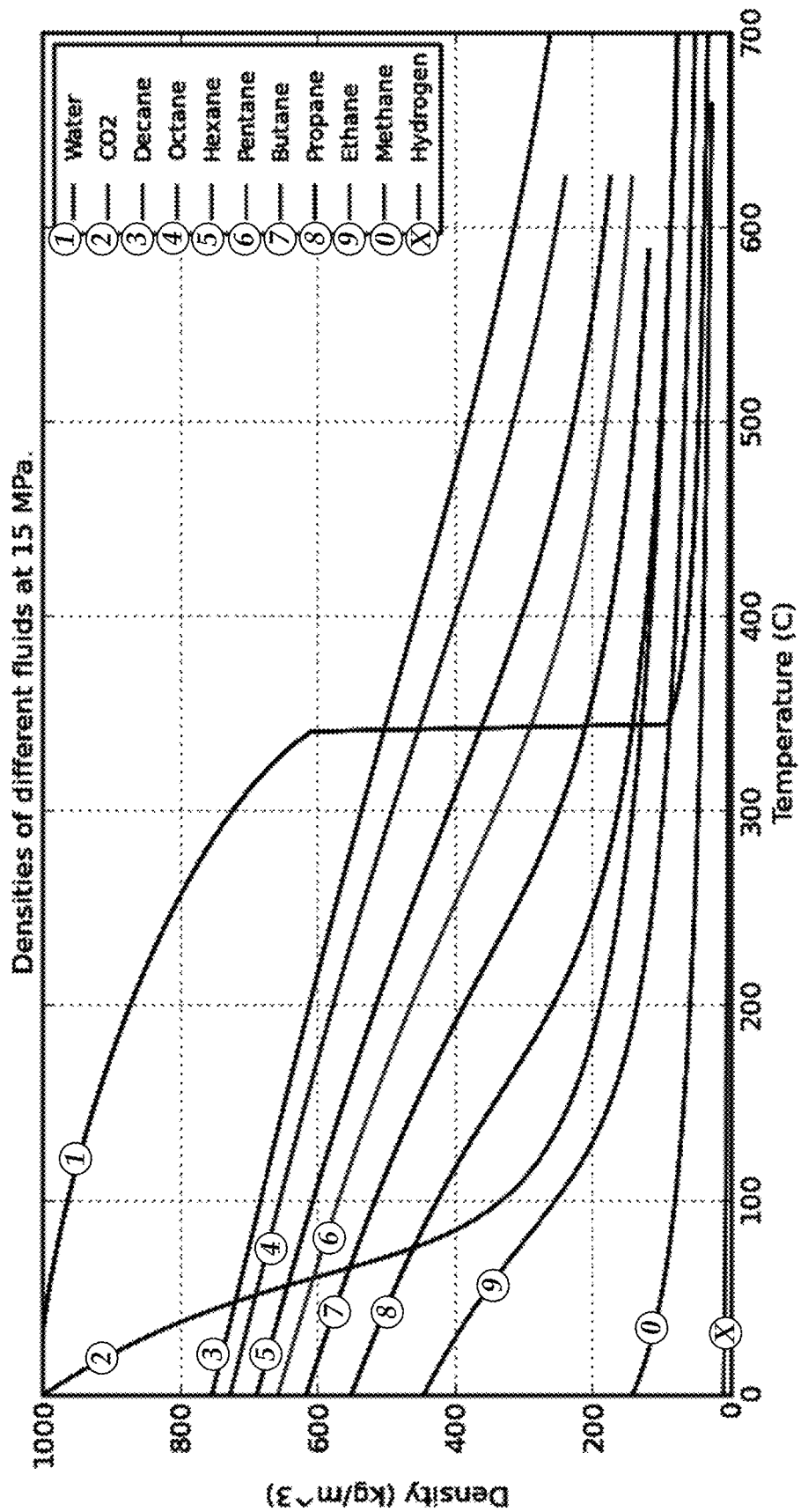
FIG. 13 illustrates an example graph of the density of various compounds by temperature at 15 MPa.

In some embodiments, supercritical operation may favor slightly lower pressure at higher temperature in some examples. For example, FIG. 13 illustrates an example graph of the density of various compounds by temperature at 15 MPa.

Figure 14:
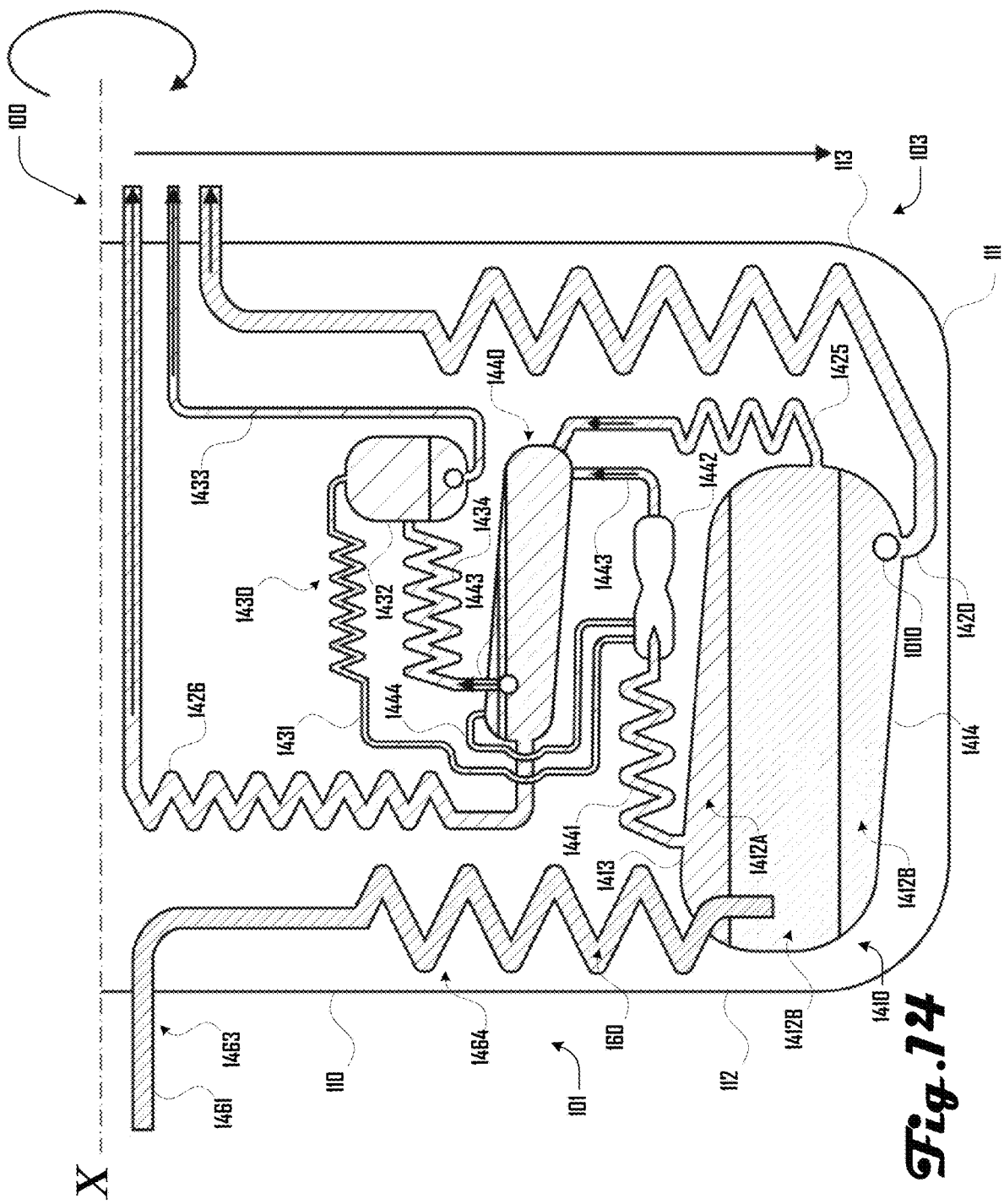
FIG. 14 shows an example of supercritical operation in a centrifuge reactor including steam reformation of hydrocarbon gases for hydrogen production which can then be used to hydrogenate carbon solids and remove oxygen from liquid hydrocarbons.

FIG. 14 shows an example of supercritical operation in a centrifuge reactor 100 including steam reformation of hydrocarbon gases for hydrogen production which can then be used to hydrogenate carbon solids and remove oxygen from liquid hydrocarbons, upgrading it. Overtly, carbon dioxide can be continuously removed from this reaction equilibrium and this can be how oxygen is removed from the reaction chamber 1410. Water can also be continuously removed in some examples, but can be re-added, as required, to promote steam reforming and the hydrogenation process. The hydrogenation process can increase with temperature and catalysts can also be used in some examples. With appropriate optimization, the reaction products can be almost exclusively high value liquid hydrocarbons of a desired density, requiring a minimum of further refining and impurity removal in some examples. Within the centrifuge reaction chamber 1410, overly dense hydrocarbons and carbon solids can be at greater radius from central rotational axis X where they can be actively hydrogenated, while overly light hydrocarbons can be at smaller radius from central rotational axis X where such light hydrocarbons can undergo steam reformation, creating hydrogen to drive this process. Oils of a desired density can be removed from the reaction process at medium radius from central rotational axis X. Multiple reaction chambers 1410 can be used in some embodiments, if desired, to further settle and separate desired densities.

FIG. 14 illustrates another example of a centrifuge reactor 100 that includes separated hydrothermal liquefaction and steam reforming/hydrogenation reaction chambers. More specifically, FIG. 14 illustrates a centrifuge reactor 100 comprising a channel 160 that runs through centrifuge reactor 100 from the first end 101 to the second end 102. Specifically, as shown in the example embodiment of FIG. 14, the channel 160 comprises a channel opening 1461 that opens to a first channel portion 1464 that extends perpendicular to the axis X and along the first housing end 112 at the first end 101 of the centrifuge reactor 100.

The channel 160 continues to a reaction chamber 1410, where pressure, temperature and/or rotational forces applied to the reaction chamber 1410 as discussed herein can generate one or more product separations or gradients, from a first end 1413 to a second of the 1414 of the reaction chamber 1410. Such product separations or gradients can be generated based on one or more of an acceleration gradient within reaction chamber 1410 from the first end 1413 to the second end 1414 generated based on rotation of the reaction chamber 1410 about the rotational axis X; the same or different pressures within the reaction chamber portions 1412, the same or different temperatures within the reaction chamber portions 1412, removal and/or addition of certain compounds, elements, or materials from the reaction chamber 1410 and the like.

For example, FIG. 14 illustrates an example having three product separations 1412 with a first portion 1412A at the first end 1413 that can include products such as hydrogen, methane ($CH_4$), carbon dioxide ($CO_2$), and the like. The second portion 1412B can comprise oil/hydrocarbons, and tar. The third portion 1412C at the second end 1414 can comprise water, salts dissolved in the water, and the like.

Water (and materials dissolved and/or suspended in the water) can be removed from the third portion 1412C via a first fraction channel 1420 that extends along the sidewall 111 to the second end 103 of the centrifuge reactor 100 and along the second housing 113 and out of the centrifuge reactor 100 at the second end 103 proximate to the central axis X. In various examples, the first fraction channel 1420 can be coupled proximate to the second end 1414 and proximate to the third chamber portion 1412C.

Additionally, oil, char and/or hydrocarbons can be removed from the second chamber portion 1412B between the first and second ends 1413, 1414 via a second fraction channel 1425 that can extend from a side of the reaction chamber 1410 to a hydrogenation chamber 1440. In some embodiments, the hydrogenation chamber 1410 can operate at about 600° C. and 20 MPa. In some embodiments, the hydrogenation chamber 1410 can operate at about 550° C.-650° C. and 15 MPa-35 MPa, or within other suitable ranges.

In various embodiments, a gasoline equivalent, diesel equivalent, jet-fuel equivalent and/or the like can be removed from the hydrogenation chamber 1440 via a third fraction channel 1426 that extends to and then along the central rotational axis X and out of the centrifuge reactor 100 at the second end 103 proximate to the central axis X.

Additionally, gasses such as hydrogen, carbon dioxide and methane can be removed from the first separation portion 1412A to a pump 1442 (e.g., a Venturi pump) via a first line 1441. Such gas can be directed to a carbon dioxide separator system 1430 via a first separator line to a carbon dioxide separator 1432 that at least separates carbon dioxide from material received from the pump 1443 via the first line 1431. In some embodiments the carbon dioxide separator 1432 can operate at about 50° C. and about 15 MPa. In further embodiments, the carbon dioxide separator 1432 can operate at 40° C.-60° C. and 10-20 MPa, or within other suitable ranges.

Carbon dioxide can leave the centrifuge reactor via an exit line 1433 that can be proximate to the central rotational axis X, a return line 1434 can direct material remaining after carbon dioxide separation to the hydrogenation chamber 1440. Gasses generated in the hydrogenation chamber 1440 can be removed at a first end of the hydrogenation chamber 1440 via a gas line 1444, which can direct the gas to the pump 1442, which can then direct the gas to the carbon dioxide separation system 1430.

In various embodiments, a reaction chamber 1410 can be exposed to various conditions as discussed herein. For example, where the reaction chamber 1410 is rotated as discussed herein, the reaction chamber can experience an acceleration gradient from the first end 1413 to the second end 1414 (e.g., $p=\frac{1}{2}\rho v^2$). In some embodiments, the same or different temperatures can be applied to or generated in different portions of the reaction chamber 1410 to generate desired product separations or gradients within portions 1412 of the reaction chamber 1410.

For example, in one embodiment, the reaction chamber 1410 can have a reaction temperature of 350° C. or in some embodiments can have a temperature within in the range of 300° C.-400° C., 325° C.-375° C., or the like. In one embodiment, the reaction chamber 1410 can have a reaction pressure of 25 MPa or in some embodiments, can have a reaction pressure in the range of 20-35 MPa, or the like.

In various embodiments, the reaction chamber 1410 can be disposed at a greater radius from the central rotational axis X compared to the position of the hydrogenation chamber 1440 and in some embodiments, the pump 1442 can be disposed at a radius between the radius of the reaction chamber 1410 and the hydrogenation chamber 1440. In some embodiments, the carbon dioxide separator 1432 can be disposed at a shorter radius from the central rotational axis X compared to the position of the hydrogenation chamber 1440, pump 1442, and reaction chamber 1410.

As shown in the example of FIG. 14, the first and second ends 1413, 1414 of the reaction chamber 1410 can be disposed non-parallel to the central rotational axis X (in contrast to the ends 213, 214 shown disposed parallel to the central rotational axis X in FIG. 2). As shown in the example of FIG. 14, the first end 1443 (and an opposing end) of the hydrogenation chamber 1440 can be disposed non-parallel to the central rotational axis X.

In some examples, care must be taken to ensure adequate mixing within a reaction chamber of the centrifuge reactor 100, which may strongly favor separation of liquids and gases in various embodiments. There are a number of suitable methods of powering such mixing including centrifuge speed pulsing, gas entrainment on fluid flows, spiral flow mixing of combined gas/liquid phases, heat engine gas pressurization for gas recirculation, active pumping of gases so as to bubble them through the liquid mix, and the like. Having a portion of the reaction chamber which is not subject to such mixing can be desirable in some embodiments so as to allow liquids to settle for more effective separation. Flow baffles can further be added to reduce mixing and encourage fractionation. Active gas pumping can provide direct external control of the overall reaction rate and can provide a fast acting reaction off switch for a reaction within the reaction chamber.

In some examples of a centrifuge reactor 100, a supercritical centrifuge reaction chamber can be independent of a subcritical centrifuge reaction chamber or they can be both integrated into the same centrifuge assembly 150. The latter, in some examples, can allow for a more compact and more efficient system which can ultimately be lower in cost in some embodiments. Reaction chamber temperature control and individual control of respective flows within the channel 160, and portions thereof, can also be desirable in some embodiments. In various examples, this can occur externally to the centrifuge assembly 150, so as to simplify the design centrifuge assembly 150, for example, by regulating fluid flows externally to the centrifuge assembly 150. The net reaction of converting cellulose material to oil and carbon dioxide can be slightly exothermic, however with exergy losses it is possible that in some cases some small quantity of heat may need to be actively applied to regulate reaction chamber temperatures. This can be accomplished, in some examples, via the combustion of some small proportion of undesired reaction products (e.g., methane). However, in various embodiments, the system can ultimately be highly efficient in energy use, heat recovery, and in yield of desired hydrocarbons. Especially considering that undesired reaction products can be recycled back through the system in some examples.

An example path to the manufacture of centrifuge reactors 100 is to use direct metal laser sintering of Inconel (3D printing). Desired tip speeds and temperatures of a centrifuge reactor 100 can approach that of steam turbines, and similar materials can be used in some embodiments. 3D printing of Inconel (a high nickel content super alloy) may not be prohibitively expensive, especially at smaller scales, and can allow for the integral construction of complex flow paths and elaborate heat exchangers. Inconel can also serve as a catalyst for steam reforming in some examples and high surface area structures are possible. 3D printing of Inconel can be a desirable approach for initial prototyping and development, and it can come down in cost over time and become suitable for large scale production in this circumstance. Reinforcing an Inconel centrifuge assembly 150 with actively cooled carbon fiber structure can enable a near order of magnitude reduction in overall weight and cost.

Figure 15:
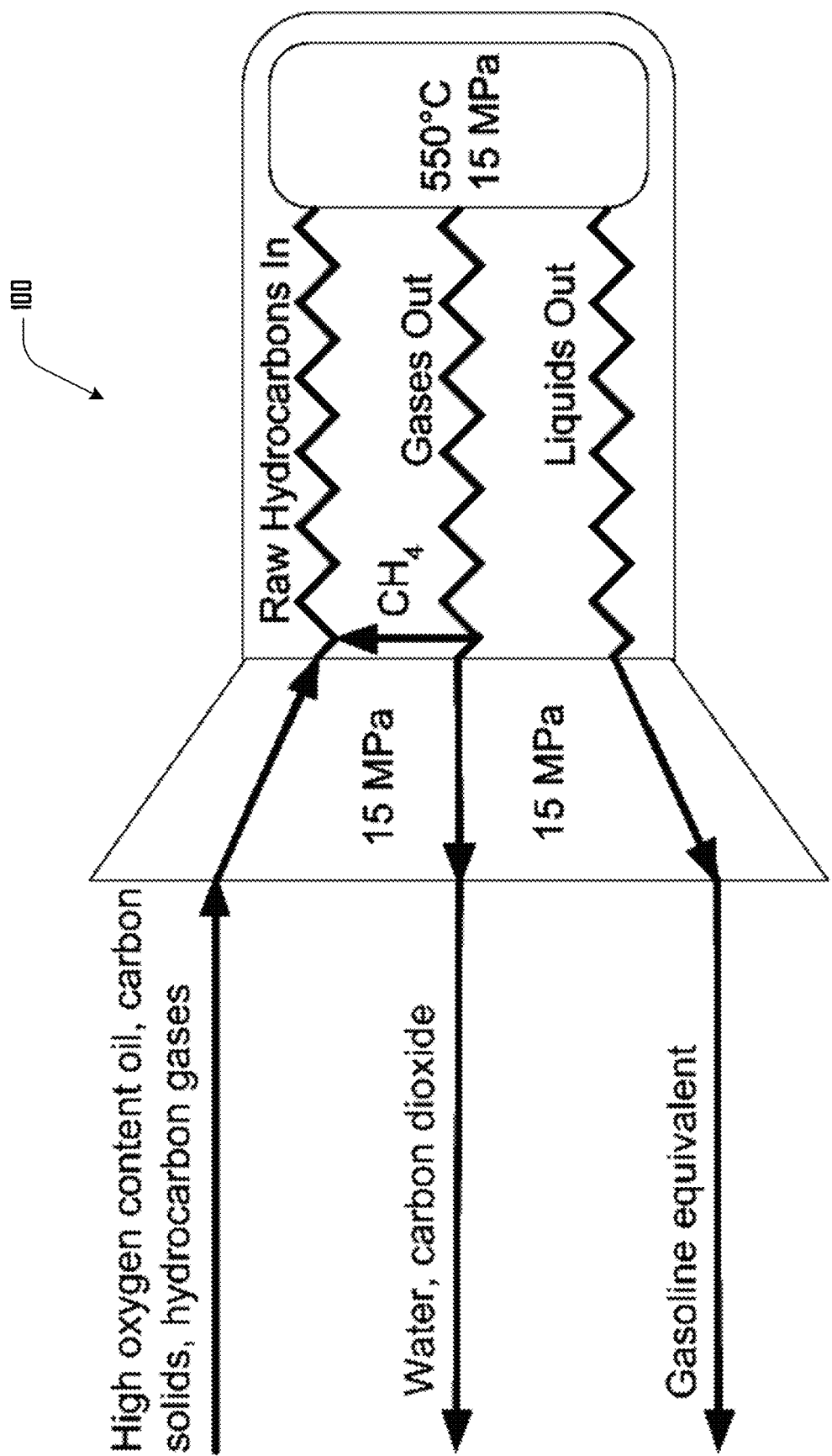
FIG. 15 illustrates another example embodiment of a centrifuge reactor, wherein supercritical operation can allow for the integration of mild methane steam reforming creating a slightly hydrogen rich reaction.

FIG. 15 illustrates another example embodiment of a centrifuge reactor 100, wherein supercritical operation can allow for the integration of mild methane steam reforming creating a slightly hydrogen rich reaction. Carbon solids can be hydrogenated and oxygen content removed. This equilibrium reaction can be further encouraged by the continual removal of carbon dioxide. Care must be taken, in some embodiments, with respect to mixing and catalysts can be used if desired.

TABLE 3

Example Alkane boiling points and densities

| Alkane | Formula | Boiling point (° C.) | Density (kg/m$^3$) |
| --- | --- | --- | --- |
| Methane | $CH_4$ | −162 | 422 (BP) |
| Ethane | $C_2H_6$ | −89 | 544 (BP) |
| Propane | $C_3H_8$ | −42 | 581 (BP) |
| Butane | $C_4H_{10}$ | 0 | 601 (BP) |
| Pentane | $C_5H_{12}$ | 36 | 626 (20° C.) |
| Hexane | $C_6H_{14}$ | 69 | 659 (20° C.) |
| Heptane | $C_7H_{16}$ | 98 | 684 (20° C.) |
| Octane | $C_8H_{18}$ | 126 | 703 (20° C.) |
| Nonane | $C_9H_{20}$ | 151 | 718 (20° C.) |
| Decane | $C_{10}H_{22}$ | 174 | 730 (20° C.) |
| Undecane | $C_{11}H_{24}$ | 196 | 740 (20° C.) |
| Dodecane | $C_{12}H_{26}$ | 216 | 749 (20° C.) |
| Tridecane | $C_{13}H_{28}$ | 235 | 756 (20° C.) |
| Tetradecane | $C_{14}H_{30}$ | 254 | 763 (20° C.) |
| Pentadecane | $C_{15}H_{232}$ | 271 | 768 (20° C.) |

Figure 16:
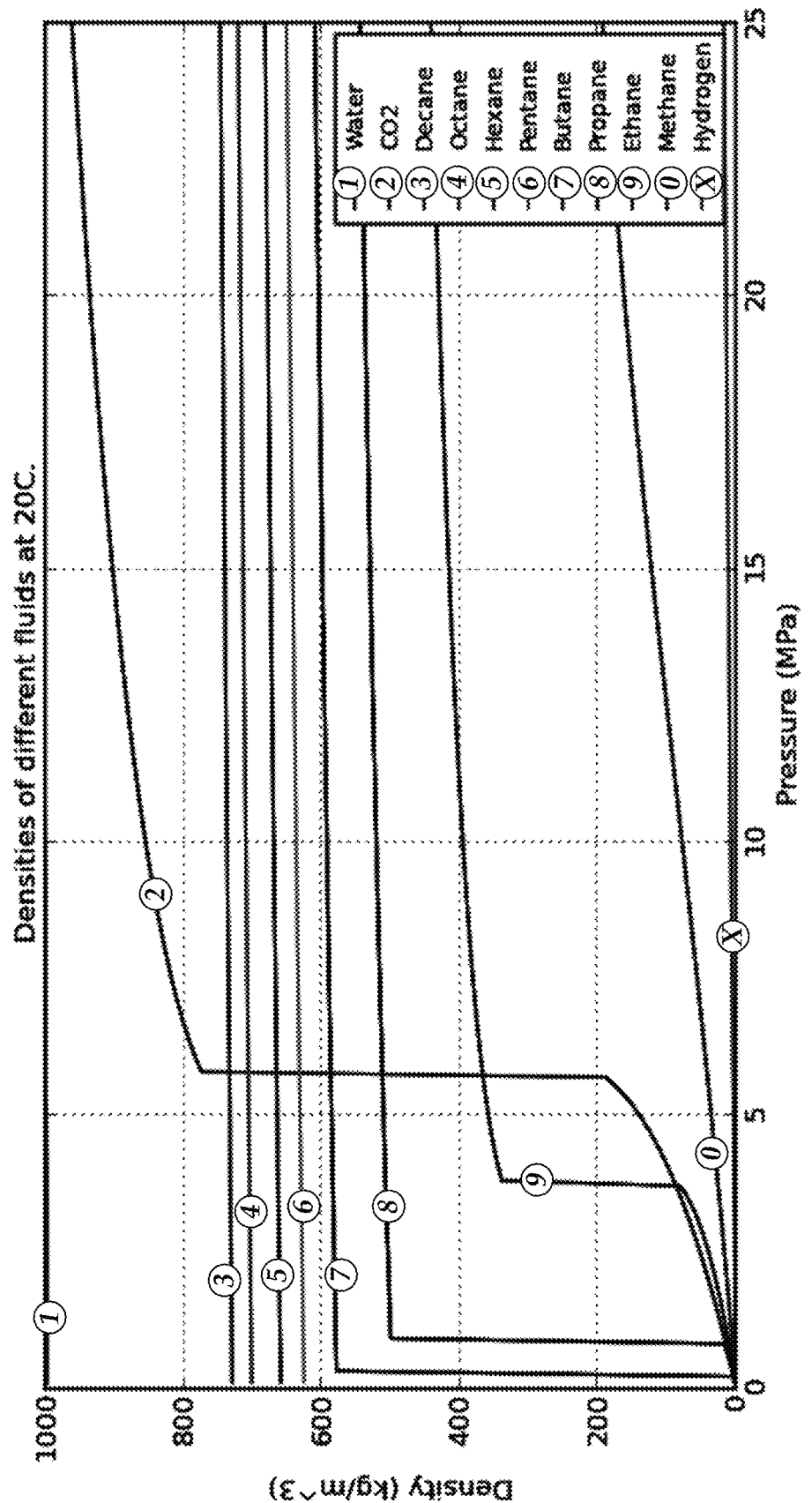
FIG. 16 is a graph of the densities of different fluids at 20° C. and at different pressures.

Pressure can also be used to facilitate density based separation in some examples. For example, FIG. 16 is a graph of the densities of different fluids at 20° C. and at different pressures.

TABLE 4

Example chemical process reaction conditions.

| Chemical Process | Temperature | Pressure |
| --- | --- | --- |
| Thermal Depolymerization | 250-550° C. | 5-25 MPa |
| Gasification | 800-1900° C. | 0.1-10 MPa |
| Sabatier Reaction ($CO_2 + 4H_2 \Rightarrow CH_4 + 2H_2O$) | 300-400° C. | 0.1-3 MPa |
| Steam Reforming (hydrogen) | 700-1100° C. | 1.5-4 MPa |
| HydroTreating (hydrodesulfurization) | 300-400° C. | 3-13 MPa |
| Hydrocracking | 400-800° C. | 7-14 MPa |

TABLE 4-continued

Example chemical process reaction conditions.

| Chemical Process | Temperature | Pressure |
|---|---|---|
| Water Shift Reaction (hydrogen) | 200-550° C. | 0.1-80 MPa |
| Fischer Tropsch Process (solids to gases to liquids) | 150-300° C. | 0.1-5 MPa |
| Haber Bosch Process (ammonia) | 400-500° C. | 15-25 MPa |

In some embodiments, centripetal hydrothermal liquefaction process can be applied to existing oil refineries that use fossil fuels and it can also find application in gas and coal to liquids processing plants. Other chemical processes, including steam reformation for hydrogen production, Fischer Tropsch for gas to liquids, and Haber Bosch for ammonia production can be directly integrated into a centrifuge reactor 100. Such reactions can be used to bias reaction products and can also play a role in thermal management and energy recovery. Via such methods it is possible to achieve full feedstock conversion to the desired reaction products in various examples, within the limits of raw element and energy availability. For example, with various direct energy addition methods, (e.g., electrolysis, thermo-chemical water splitting, thermo-chemical carbon dioxide splitting, thermo-chemical carbon monoxide splitting, oxidation reactions, and so forth), it can be possible to fully hydrogenate carbon-heavy feed stocks.

In some embodiments, a centrifuge reactor 100 can be constructed from standard materials, (e.g., mostly steel and stainless steel), at relatively low cost. Mechanically speaking, in some examples, the centrifuge assembly 150 in some examples can be mostly just be a large flywheel. Various embodiments can include one or more of auto balancers, bearings, an electric motor to control speed and overcome friction, a burner to provide heat, and the like. With process resident times as fast as a few minutes in some examples, such elements can weigh less than the quantity of hydrocarbons that they can process in an hour and the base machinery cost can be very low. Dominant costs of some embodiments can come in instrumentation, controls, additional processes, feedstock and product handling and storage, quality control, contaminant management, and so forth.

Oil refineries typically have a marginal cost in the $4 to $12/barrel range, or $0.1 to $0.3/GGE, depending on scale, which equates to around $0.003 to $0.009 per kWhr of energy content. Oil refineries have also been estimated to have average efficiencies of around 88%. Centripetal hydrothermal liquefaction employed by a centrifuge reactor 100 can be a much simpler and more efficient process in various embodiments, with very high flow rates, although cost can depend on scale of operation and feedstock.

TABLE 5

Approximate feedstock and fuel energy content and cost.

| Feedstock/fossil fuels | Specific Energy | Cost Per Ton | Energy Cost |
|---|---|---|---|
| Biomass sewage sludge | 20-22 MJ/kg | $0/ton? | $0.00/kWhr? |
| Biomass municipal waste | 15-25 MJ/kg | $0/ton? | $0.00/kWhr? |
| Biomass forestry waste | 12-20 MJ/kg | $20-80/ton | $0.004-0.024/kWhr |
| Biomass agricultural waste | 15-21 MJ/kg | $50-100/ton | $0.012-0.017/kWhr |
| Biomass energy crops | 15-21 MJ/kg | $50-100/ton | $0.012-0.017/kWhr |
| Coal subbituminous | 19-27 MJ/kg | $15/ton | $0.002-0.003/kWhr |
| Coal bituminous | 24-35 MJ/kg | $50/ton | $0.005-0.0075/kWhr |
| Natural gas | 55.5 MJ/kg | $160/ton | $0.01/kWhr |
| Crude oil | 44 MJ/kg | $350/ton | $0.03/kWhr |

In comparison, the marginal cost of centripetal thermal depolymerization in some examples can be significantly less than $10/barrel. The output of the centripetal hydrothermal liquefaction system, such as a centrifuge reactor 100, can then pass through a more traditional oil refinery. For a fully integrated centrifuge reactor 100 of some embodiments, with hydrothermal liquefaction, steam reforming, and hydrogenation, costs comparable to an oil refinery can still be expected in some examples, although this may not depend on scale of operation and balance of system costs—oil refineries achieve low cost by being very large. At such low marginal processing costs, the produced oil costs can be dominated by raw feedstock and balance of system costs in some examples. In the case of municipal waste, sewage sludge, and in the field forestry slash and agricultural waste, feedstock/biomass costs can be very low.

Natural gas is worth around twice as much as coal and oil is worth around three times as much as natural gas. Agricultural and forestry waste, including energy crops, can be at a low cost in the field, but once chipped/baled and collected, tend to be comparable in cost to natural gas (based on energy content). Hence, in some embodiments, there can be mobile centrifuge reactors in combine harvester type vehicles that process the feedstock directly in the field. This can also allow for the direct return of nutrients to the soil. Sewage and municipal waste feedstocks have a potentially significant negative cost (one would get paid to use them), but may have greater regulatory constraints and contamination issues in various examples. Some feedstocks can produce higher oil yields than others via hydrothermal liquefaction, so feedstock can directly affect the degree of steam reforming and hydrogenation required in some embodiments. Ideally one would like to use the lowest cost feedstock and convert it into the highest value product (liquid fuels), within scaling constraints, etc. Generally speaking the available forestry and agricultural waste resource is an order of magnitude or larger than the sewage sludge and municipal waste resource.

Further embodiments can exploit differences in distribution costs to significantly increase the cost advantage of biofuels. Fossil fuels can be extracted and refined in a centralized manner and can have a retail to bulk wholesale price ratio of around two to three times. Unlike fossil fuels, biomass feedstocks may already be distributed, and so potentially the distribution costs can be greatly reduced, if the produced oil can be used close to the feedstock source. To achieve this, the use of many small scale distributed centrifuge hydrothermal liquefaction systems with integral upgrading can be employed.

The centrifuge hydrothermal liquefaction system such as a centrifuge reactor 100 of some embodiments can be light weight and compact enough, with sufficiently high throughput, that it can be used in mobile applications. Mobile plants can be taken on site for the direct processing of biomass. For example, agricultural and forestry waste can be directly converted on site via a mobile unit. The resultant oil being far more energy dense than the biomass and much more convenient to transport. Transport costs can factor significantly into the cost of biomass feedstocks and this can be a substantial saving in some embodiments; greatly improving the economics of biomass to oil conversion and mitigating the low cost advantage that natural gas and coal can have. A combine harvester type vehicle with a centrifuge reactor 100 that exudes upgraded gasoline/diesel/jet-fuel directly into a tanker truck and nutrients and fertilizer directly back into the ground can be part of some embodiments.

The power densities of some embodiments of a centrifuge hydrothermal liquefaction system, such as a centrifuge reactor 100 in some embodiments, can be so high as to be desirable in mobile applications such as agricultural, forestry, and earth moving machinery, cars, trains, trucks, ships and the like. A simpler hydrothermal liquefaction only centrifuge reactor 100 can be used as a clean gasifier that can power traditional internal combustion engines directly. One implementation of this can be a mobile harvester that collects and processes biomass directly, producing oil that might then be trucked out. Similar to how combine harvesters operate today, this can also be applicable to forestry sites, scrub clean up, grass mowing, forest dead tree removal, undergrowth clearing for fire prevention, tree pruning, and so forth. The harvester can be powered directly off gasified products while collecting oil and reapplying carbon solids and nutrients back into the soil (e.g., biochar).

A hydrothermal liquefaction process for oil creation can use coal as a feedstock, and this can be a clean process in some embodiments. Centripetal hydrothermal liquefaction, as applied to low grade low cost coal, can reduce plant costs, dramatically increase efficiency, and also improve oil quality. The direct selective separation of carbon dioxide from the reaction process can bias reactions towards hydrogenation in various examples and can make more aggressive reaction conditions possible—higher temperatures and pressures and shorter residence times leading to significantly higher production rates from smaller systems. Given the relative costs of fossil fuels and the low marginal cost of this chemical process in some examples, this can enable crude oil production at less than $20/barrel. Global coal reserves are an order of magnitude greater than global oil reserves—hundreds of years at current production rates. The USA has greater known coal reserves than any other country and this would enable the USA to become a net oil exporter. Of course this may not be ideal from a carbon dioxide emission standpoint, although there are some hybrid feedstock options that would improve this (biomass and/or natural gas addition), and this infrastructural development, presumably paid for by the coal industry, can pave the way to a full transition to biomass feedstocks and a 100% renewable hydrocarbon economy.

A centrifuge reactor 100 of further embodiments can be used for chemical processes like coal gasification, Fischer Tropsch (coal to oil), and natural gas to oil conversion systems. And in various embodiments, at significantly lower cost than current plants. In a processing plant, some combination of some or all of the above chemical processes can be used so as to maximize oil yield and efficiency. Fluidized bed reactors and catalysts can be directly incorporated into the centrifuge reactor 100 in some examples. With the very high acceleration gradients of some examples, mixing via injected gas streams can be very aggressive. Gas streams can also be created at different pressures and re-entrained into fluid flows so as to continually recycle these gas flows in accordance with some embodiments. For example, a small quantity of liquid slurry feedstock can be gasified at a slightly higher radius from central rotational axis X, and thereby pressure than the primary reaction chamber. After being bubbled through that reaction chamber it can still be at much higher pressure than the incoming feedstock at that radius due to its lower density, so it can then be re-injected/entrained into the incoming liquid feedstock and carried back out to the centrifuge tip, where it can be re-pressurized back to high pressure.

Coal power plants can average around 33% efficiency, whereas combined cycle natural gas power stations can achieve 55-60% efficiency. Globally, approximately 41% of electricity is generated from coal and in the USA around 90% of all coal is used for generating electricity—approximately 24.5% of US $CO_2$ emissions come from coal.

Various embodiments of a centrifuge reactor 100 can be used to gasify coal, separate the primary contaminates, and also produce a small proportion of easily extracted oil. The cleaned gasified coal can then be passed directly into a combined cycle power plant, and in some examples, at around two thirds higher efficiency than a standard steam turbine based coal power station. The same total electricity could be produced with only 60% of the coal. If all coal power stations in the USA were converted to this system, coal consumption would be reduced by nearly 40% and total USA carbon dioxide emissions would be reduced by around 10%. Air pollution from coal would also be largely eliminated. This system of some embodiments would be a dramatic improvement, especially for countries with large coal reserves and limited natural gas reserves that generate a lot of their electricity from coal.

A centrifuge reactor 100 of further embodiments can also be used for gas to oil chemical conversion processes. The centrifuge can enable direct separation of desired liquid hydrocarbons during the reaction process and thereby reaction equilibrium biasing. Catalysts can be used in various examples. With relatively light weight compact plants that can be moved to remote locations, it is possible to recover stranded natural gas. Stranded natural gas is that natural gas that is located in remote wells where it is too expensive to transport the natural gas to market, generally for lack of a cost effective long distance natural gas transport pipe system. If these stranded natural gas supplies can be easily converted to liquid fuels on site, then they can be transported out via traditional oil transport means—trains, trucks, and so forth.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of example embodiments should not be construed to be exclusive to any given example embodiment. For example, further embodiments can combine example elements of any given embodiment in any suitable way or various elements can be absent in some embodiments. Accordingly, the example elements of a given embodiment should be construed to be interchangeable between various other embodiments.

What is claimed is:

1. A method of generating a reaction product from a feedstock via a centrifuge reactor, the method comprising:
   introducing a flow of feedstock to a centrifuge reactor, the centrifuge reactor including:
      a central rotational axis X, and
      a centrifuge assembly configured to rotate about the central rotational axis X, the centrifuge assembly comprising:
         a reaction chamber with a first reaction chamber end that is radially closer to the central rotational axis X than a second reaction chamber end, and
         a first entry channel that allows the feedstock to enter the reaction chamber;
   rotating the centrifuge assembly about the central rotational axis X at a tip speed to generate an acceleration gradient from the central rotational axis X and from the first reaction chamber end to the second reaction chamber end;
   generating reaction conditions in the reaction chamber, the reaction conditions and acceleration gradient causing a separation of products from a reaction of the feedstock within the reaction chamber; and
   removing a first portion of the separation of products from the reaction chamber, comprising water and dissolved salts, via a first fraction channel.

2. The method of claim 1, wherein the tip speed is within a range of 100 m/s to 1000 m/s.

3. The method of claim 1, wherein the reaction conditions generated in the reaction chamber include a pressure within a range of 5 MPa to 500 MPa.

4. The method of claim 1, wherein the reaction conditions generated in the reaction chamber include a temperature within a range of 200° C. to 1000° C.

5. The method of claim 1, wherein the centrifuge reactor further comprises a housing having a sidewall, a first housing end and a second housing end that define a cavity, the first housing end defining a first housing opening and the second housing end defining a second housing opening; and wherein the centrifuge assembly is rotationally disposed within the cavity of the housing.

6. The method of claim 1, further comprising removing a second portion of the separation of products from the reaction chamber, comprising hydrocarbons, via a second fraction channel.

7. The method of claim 1, further comprising removing a third portion of separation products from the reaction chamber, comprising carbon dioxide, via a separation system;
   separating at least a portion of the carbon dioxide from the third portion of the separation products via the separation system to generate separated carbon dioxide and separation remainders; and
   at least one of:
      returning the separation remainders to the reaction chamber via the separation system; and
      combusting the separation remainders to heat the reaction chamber.

8. The method of claim 1, wherein the reaction product includes a hydrocarbon fuel that comprises at least one of a gasoline, diesel, crude oil, or jet-fuel equivalent liquid fuel.

9. The method of claim 1, wherein the feedstock enters a housing at a first housing end and at the central rotational axis X.

10. The method of claim 1, wherein the feedstock comprises coal or biomass including at least one of agricultural waste, forestry waste, and municipal waste.

11. The method of claim 1, wherein the centrifuge reactor operates in a continuous flow matter wherein a continuous flow of the feedstock is introduced into reaction chamber and continuous flows of first and second portions of the separation of products leave the centrifuge reactor.

12. The method of claim 1, further comprising one or more integral counter-flow heat exchangers that provide for heat recovery.

13. A method of generating a reaction product from a feedstock via a centrifuge reactor, the method comprising:
   introducing a flow of feedstock to a centrifuge reactor, the centrifuge reactor including:
      a central rotational axis X, and
      a centrifuge assembly configured to rotate about the central rotational axis X, the centrifuge assembly comprising:
         a reaction chamber with a first reaction chamber end that is radially closer to the central rotational axis X than a second reaction chamber end, and
         a first entry channel that allows the feedstock to enter the reaction chamber;
   rotating the centrifuge assembly about the central rotational axis X at a tip speed to generate an acceleration gradient from the central rotational axis X and from the first reaction chamber end to the second reaction chamber end;
   generating reaction conditions in the reaction chamber, the reaction conditions and acceleration gradient causing a separation of products from a reaction of the feedstock within the reaction chamber;
   removing a portion of separation products via a mixing system; and
   introducing at least part of the portion of the separation products back into the reaction chamber at the reaction chamber second end to generate mixing at the reaction chamber second end.

14. A method of generating a reaction product from a feedstock via a centrifuge reactor, the method comprising:
   introducing a flow of feedstock to a centrifuge reactor, the centrifuge reactor including:
      a central rotational axis X, and
      a centrifuge assembly configured to rotate about the central rotational axis X, the centrifuge assembly comprising:
         a reaction chamber with a first reaction chamber end that is radially closer to the central rotational axis X than a second reaction chamber end, and
         a first entry channel that allows the feedstock to enter the reaction chamber;
   rotating the centrifuge assembly about the central rotational axis X at a tip speed to generate an acceleration gradient from the central rotational axis X and from the first reaction chamber end to the second reaction chamber end; and
   generating reaction conditions in the reaction chamber, the reaction conditions and acceleration gradient causing a separation of products from a reaction of the feedstock within the reaction chamber,
   wherein a first fraction channel and a second fraction channel and a first portion of the separation of products and a second portion of the separation of products exit the centrifuge reactor at a first or second housing end.

15. A method of generating a reaction product from a feedstock via a centrifuge reactor, the method comprising:
introducing a flow of feedstock to a centrifuge reactor, the centrifuge reactor including:
a central rotational axis X, and
a centrifuge assembly having a reaction chamber, the centrifuge assembly configured to rotate about the central rotational axis X,
rotating the centrifuge assembly about the central rotational axis X at a tip speed to generate an acceleration gradient from the central rotational axis X and from a first reaction chamber end to a second reaction chamber end;
generating reaction conditions in the reaction chamber, the reaction conditions and acceleration gradient causing a separation of products from a reaction of the feedstock within the reaction chamber; and
removing a first portion of the separation of products from the reaction chamber, comprising water and dissolved salts, via a first fraction channel.

16. The method of claim 15, wherein the tip speed is within a range of 100 m/s to 1000 m/s.

17. The method of claim 15, wherein the reaction conditions generated in the reaction chamber include a pressure within a range of 5 MPa to 500 MPa.

18. The method of claim 15, wherein the reaction conditions generated in the reaction chamber include a temperature within a range of 200° C. to 1000° C.

19. The method of claim 15, wherein the first reaction chamber end being radially closer to the central rotational axis X than the second reaction chamber end.

20. The method of claim 15, wherein the reaction conditions generated in the reaction chamber include a pressure within a range of 5-25 MPa, 0.1-10 MPa, 0.1-3 MPa, 1.5-4 MPa, 3-13 MPa, 7-14 MPa, 0.1-80 MPa, 0.1-5 MPa or 15-25 MPa.

21. The method of claim 15, wherein the reaction conditions generated in the reaction chamber include a temperature within a range of 250-550° C., 800-1900° C., 300-400° C., 700-1100° C., 300-400° C., 400-800° C., 200-550° C., 150-300° C., or 400-500° C.

22. A method of generating a reaction product from a feedstock via a centrifuge reactor, the method comprising:
introducing a flow of feedstock to a centrifuge reactor, the centrifuge reactor including:
a central rotational axis X, and
a centrifuge assembly having a reaction chamber, the centrifuge assembly configured to rotate about the central rotational axis X,
rotating the centrifuge assembly about the central rotational axis X at a tip speed to generate an acceleration gradient from the central rotational axis X and from a first reaction chamber end to a second reaction chamber end;
generating reaction conditions in the reaction chamber, the reaction conditions and acceleration gradient causing a separation of products from a reaction of the feedstock within the reaction chamber;
removing a portion of the separation of products; and
reintroducing the removed portion of the separation of products back into the reaction chamber for mixing.

23. A method of generating a reaction product from a feedstock via a centrifuge reactor, the method comprising:
introducing a flow of feedstock to a centrifuge reactor, the centrifuge reactor including:
a central rotational axis X, and
a centrifuge assembly having a reaction chamber, the centrifuge assembly configured to rotate about the central rotational axis X,
rotating the centrifuge assembly about the central rotational axis X at a tip speed to generate an acceleration gradient from the central rotational axis X and from a first reaction chamber end to a second reaction chamber end; and
generating reaction conditions in the reaction chamber, the reaction conditions and acceleration gradient causing a separation of products from a reaction of the feedstock within the reaction chamber,
wherein the centrifuge reactor further includes a first fraction channel and a second fraction channel configured for a first portion of the separation of products and a second portion of the separation of products to exit the centrifuge reactor.

* * * * *